(12) United States Patent
Plotnikov et al.

(10) Patent No.: US 10,846,087 B2
(45) Date of Patent: Nov. 24, 2020

(54) SYSTEMS, APPARATUSES, AND METHODS FOR BROADCAST ARITHMETIC OPERATIONS

(71) Applicant: Intel Corporation, Santa Clara, CA (US)

(72) Inventors: Mikhail Plotnikov, Nizhny Novgorod (RU); Jesus Corbal, Barcelona (ES); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,111

(22) Filed: Dec. 30, 2016

(65) Prior Publication Data

US 2018/0189061 A1 Jul. 5, 2018

(51) Int. Cl.
*G06F 9/30* (2018.01)
*G06F 9/38* (2018.01)

(52) U.S. Cl.
CPC .......... *G06F 9/3016* (2013.01); *G06F 9/3001* (2013.01); *G06F 9/30018* (2013.01); *G06F 9/30021* (2013.01); *G06F 9/30032* (2013.01); *G06F 9/30036* (2013.01); *G06F 9/3838* (2013.01)

(58) Field of Classification Search
CPC .................................................. G06F 9/30036
See application file for complete search history.

(56) References Cited

U.S. PATENT DOCUMENTS

| 5,845,112 A * | 12/1998 | Nguyen | G06F 9/3001 |
| | | | 712/221 |
| 7,363,478 B2 * | 4/2008 | Sazegari | G06F 7/764 |
| | | | 707/E17.037 |
| 2007/0198815 A1 * | 8/2007 | Liu | G06F 7/4812 |
| | | | 712/221 |
| 2007/0283127 A1 * | 12/2007 | Kohn | G06F 9/30014 |
| | | | 711/218 |
| 2009/0100247 A1 * | 4/2009 | Moyer | G06F 9/30032 |
| | | | 712/4 |

(Continued)

FOREIGN PATENT DOCUMENTS

| WO | 2013095575 A1 | 6/2013 |
| WO | 2013095598 A1 | 6/2013 |
| WO | 2013095612 A1 | 6/2013 |

OTHER PUBLICATIONS

Extended European Search Report for Application No. 17203929.9, dated May 30, 2018, 10 pages.

*Primary Examiner* — Michael J Metzger
(74) *Attorney, Agent, or Firm* — Nicholson De Vos Webster & Elliott LLP

(57) ABSTRACT

Embodiments of systems, apparatuses, and methods for instruction execution. In some embodiments, an instruction has fields for a first and a second source operand, and a destination operand. When executed, the instruction causes an arithmetic operation on broadcasted packed data elements of the first source operand and storage of results of each arithmetic operation in the destination operand, wherein the packed data elements of the first source operand to be broadcast are dictated by values of packed data elements stored in a second source operand, wherein the arithmetic operation is defined by the instruction.

20 Claims, 22 Drawing Sheets

(56) References Cited

U.S. PATENT DOCUMENTS

| | | | |
|---|---|---|---|
| 2009/0222644 A1* | 9/2009 | Inoue | G06F 9/30021 712/22 |
| 2010/0274990 A1* | 10/2010 | Wilder | G06F 9/3001 712/22 |
| 2011/0040821 A1* | 2/2011 | Eichenberger | G06F 9/30014 708/607 |
| 2012/0113133 A1* | 5/2012 | Shpigelblat | G06F 9/30036 345/619 |
| 2013/0246737 A1* | 9/2013 | Eichenberger | G06F 9/30021 712/201 |
| 2013/0311530 A1 | 11/2013 | Lee et al. | |
| 2014/0006755 A1* | 1/2014 | Gueron | G06F 9/3001 712/222 |
| 2014/0059322 A1* | 2/2014 | Ould-Ahmed-Vall | G06F 15/8084 712/5 |
| 2014/0095842 A1 | 4/2014 | Caprioli et al. | |
| 2014/0258683 A1* | 9/2014 | Ould-Ahmed-Vall | G06F 9/30145 712/208 |
| 2014/0344553 A1* | 11/2014 | Hughes | G06F 9/3861 712/208 |
| 2015/0095623 A1* | 4/2015 | Ermolaev | G06F 9/30036 712/222 |
| 2015/0248293 A1* | 9/2015 | Gschwind | G06F 9/30036 712/225 |
| 2016/0179523 A1* | 6/2016 | Ould-Ahmed-Vall | G06F 9/30029 712/221 |
| 2016/0179537 A1* | 6/2016 | Kunzman | G06F 9/30036 712/7 |
| 2016/0283240 A1* | 9/2016 | Mishra | G06F 9/30036 |

* cited by examiner

|   | 7 | 6 | 5 | 4 | 3 | 2 | 1 | 0 |    |          |
|---|---|---|---|---|---|---|---|---|----|----------|
|   | 0 | 0 | 0 | 0 | 0 | 0 | 0 | 1 | 0  | ZMM_MASK |
|   | 0 | 0 | 0 | 0 | 0 | 0 | 1 | 1 | 1  |          |
|   | 0 | 0 | 0 | 0 | 0 | 1 | 1 | 1 | 2  |          |
|   | 0 | 0 | 0 | 0 | 1 | 1 | 1 | 1 | 3  |          |
|   | 0 | 0 | 0 | 1 | 1 | 1 | 1 | 1 | 4  |          |
|   | 0 | 0 | 1 | 1 | 1 | 1 | 1 | 1 | 5  |          |
|   | 0 | 1 | 1 | 1 | 1 | 1 | 1 | 1 | 6  |          |
|   | 1 | 1 | 1 | 1 | 1 | 1 | 1 | 1 | 7  |          |
|   | 0 | 0 | 0 | 0 | 0 | 0 | 0 | 0 | 8  |          |
|   | ... | ... | ... | ... | ... | ... | ... | ... | ... |       |
|   | 0 | 0 | 0 | 0 | 0 | 0 | 0 | 0 | 63 |          |

FIG. 2(B)

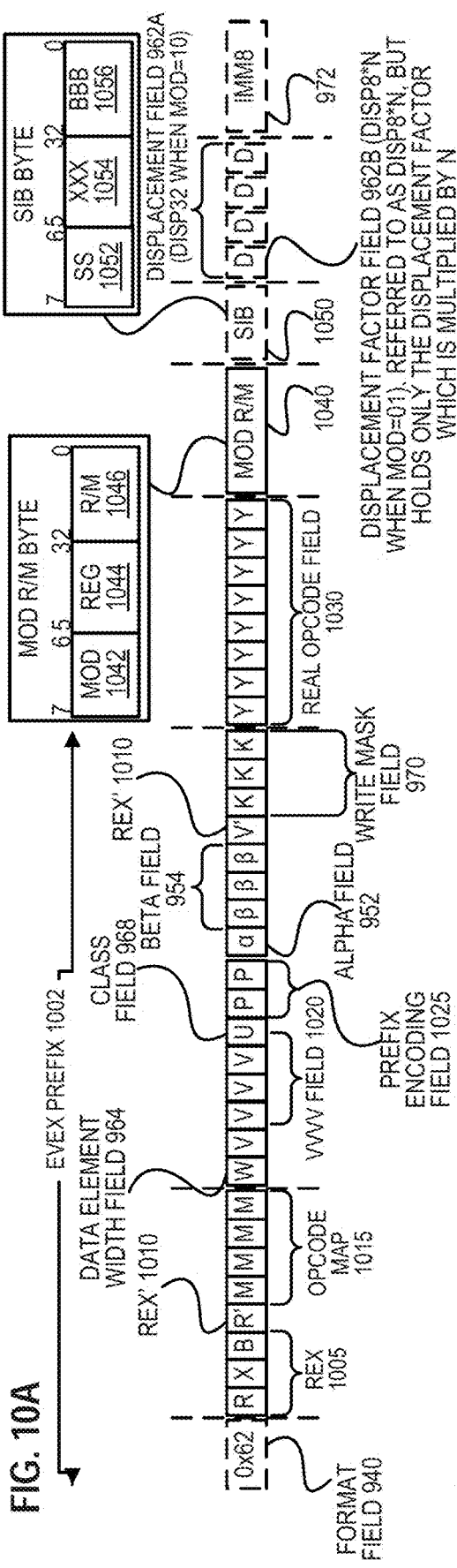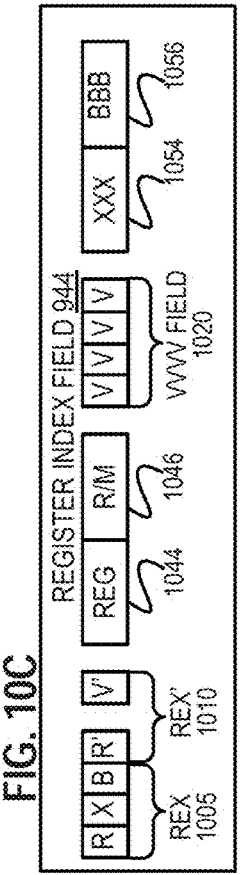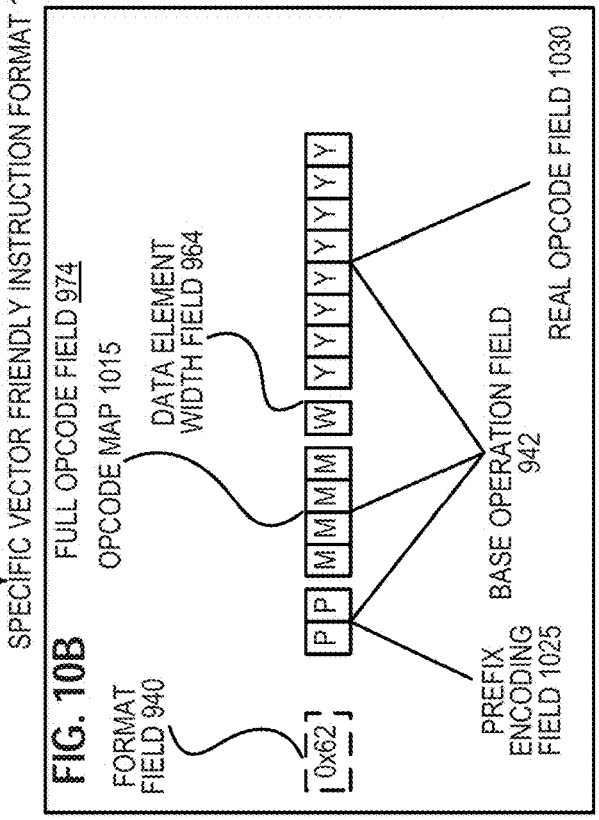

FIG. 11
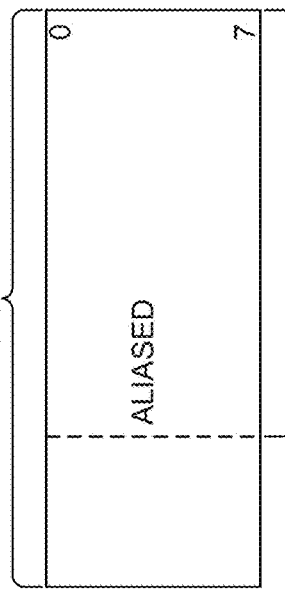
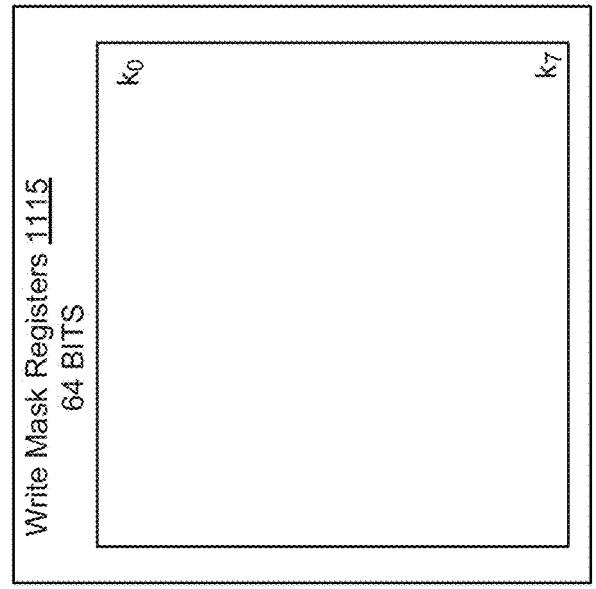
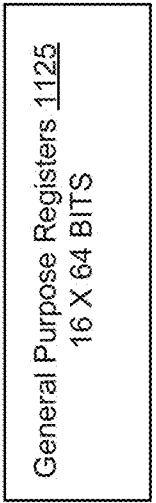
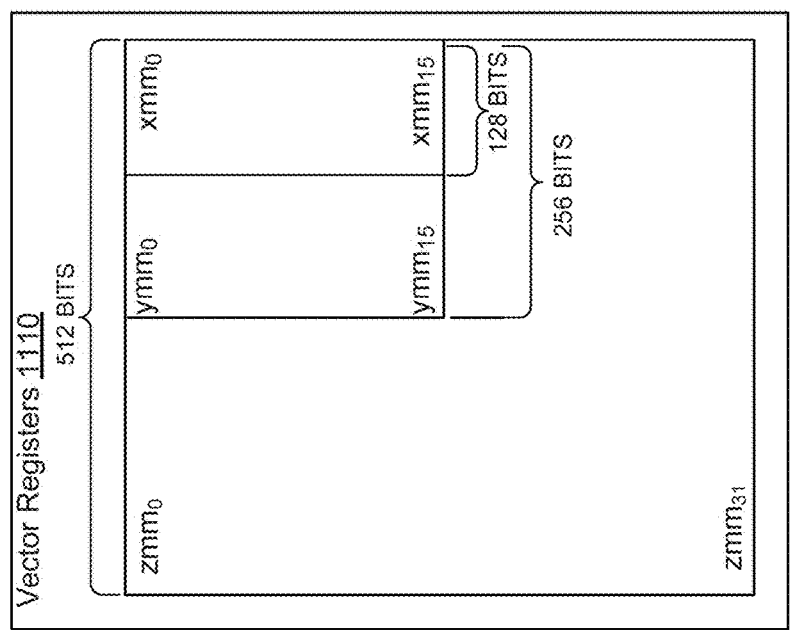

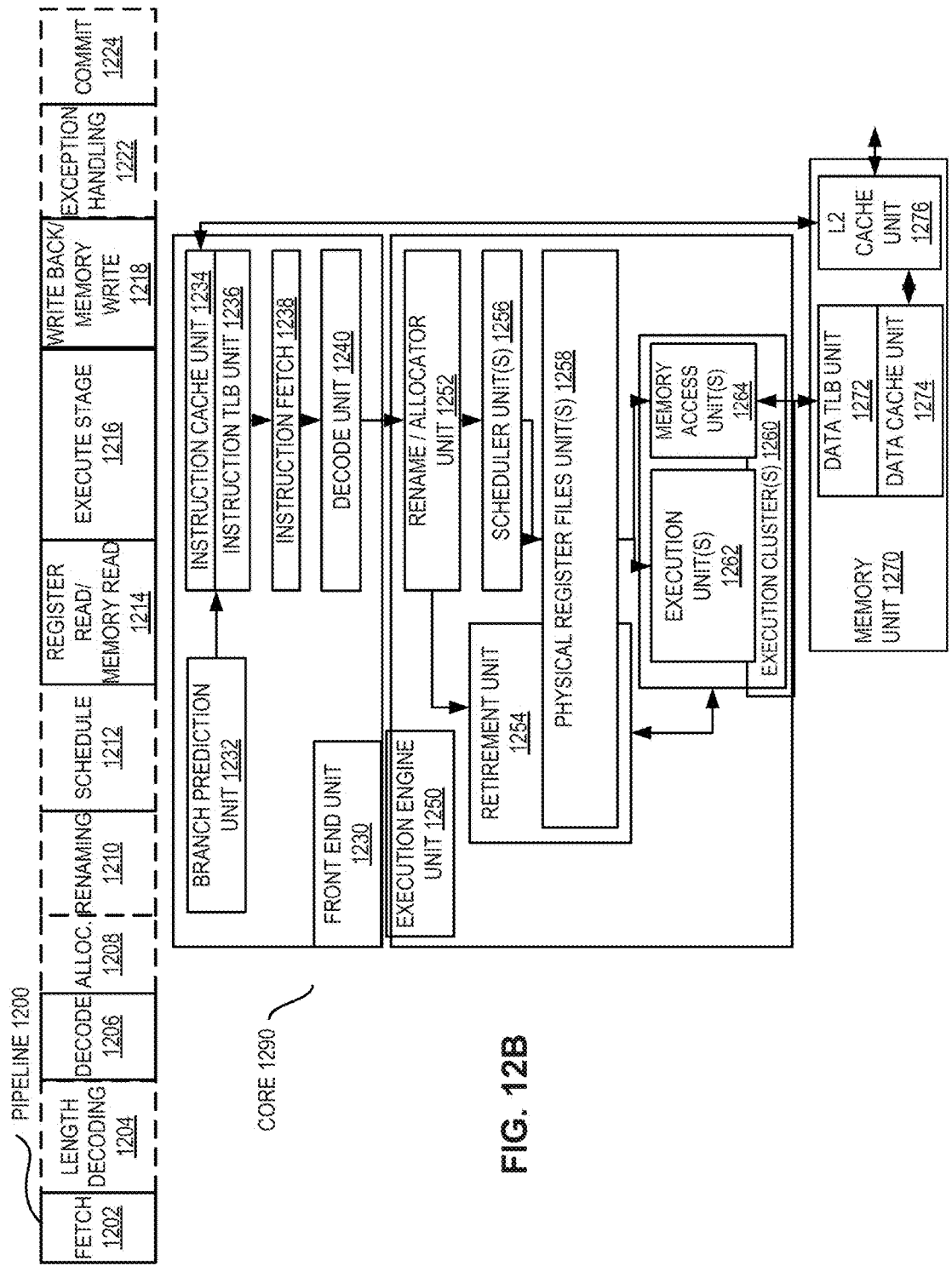

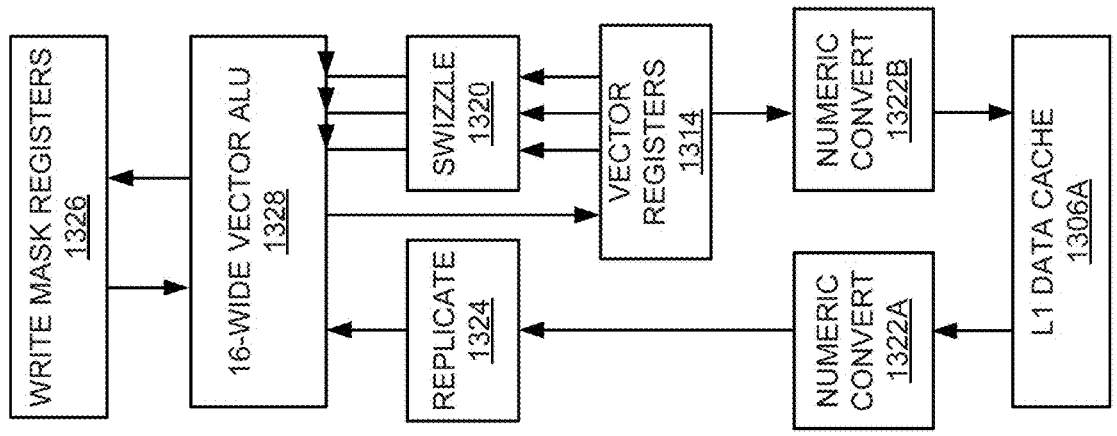
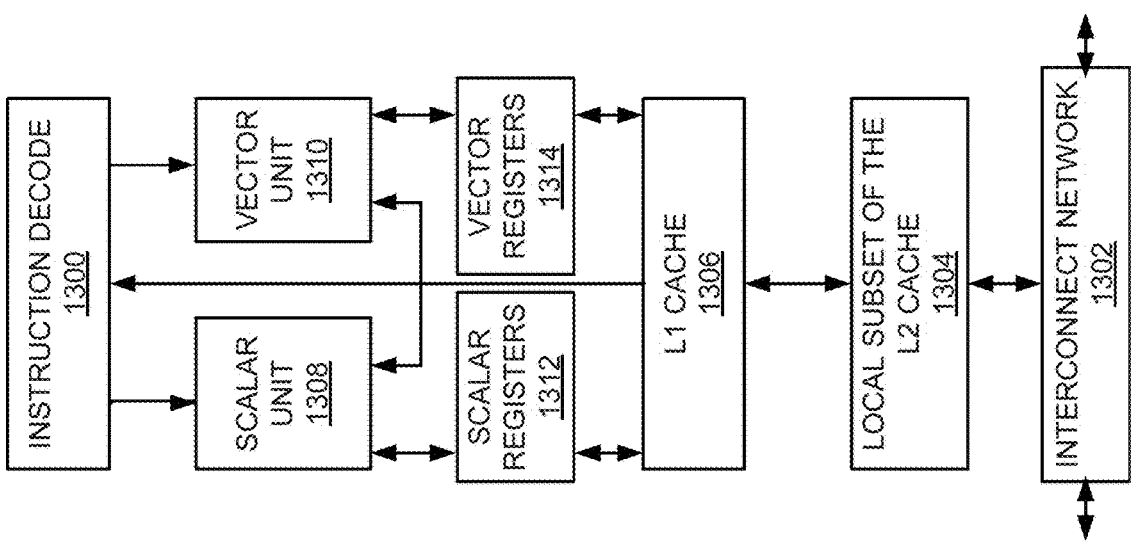

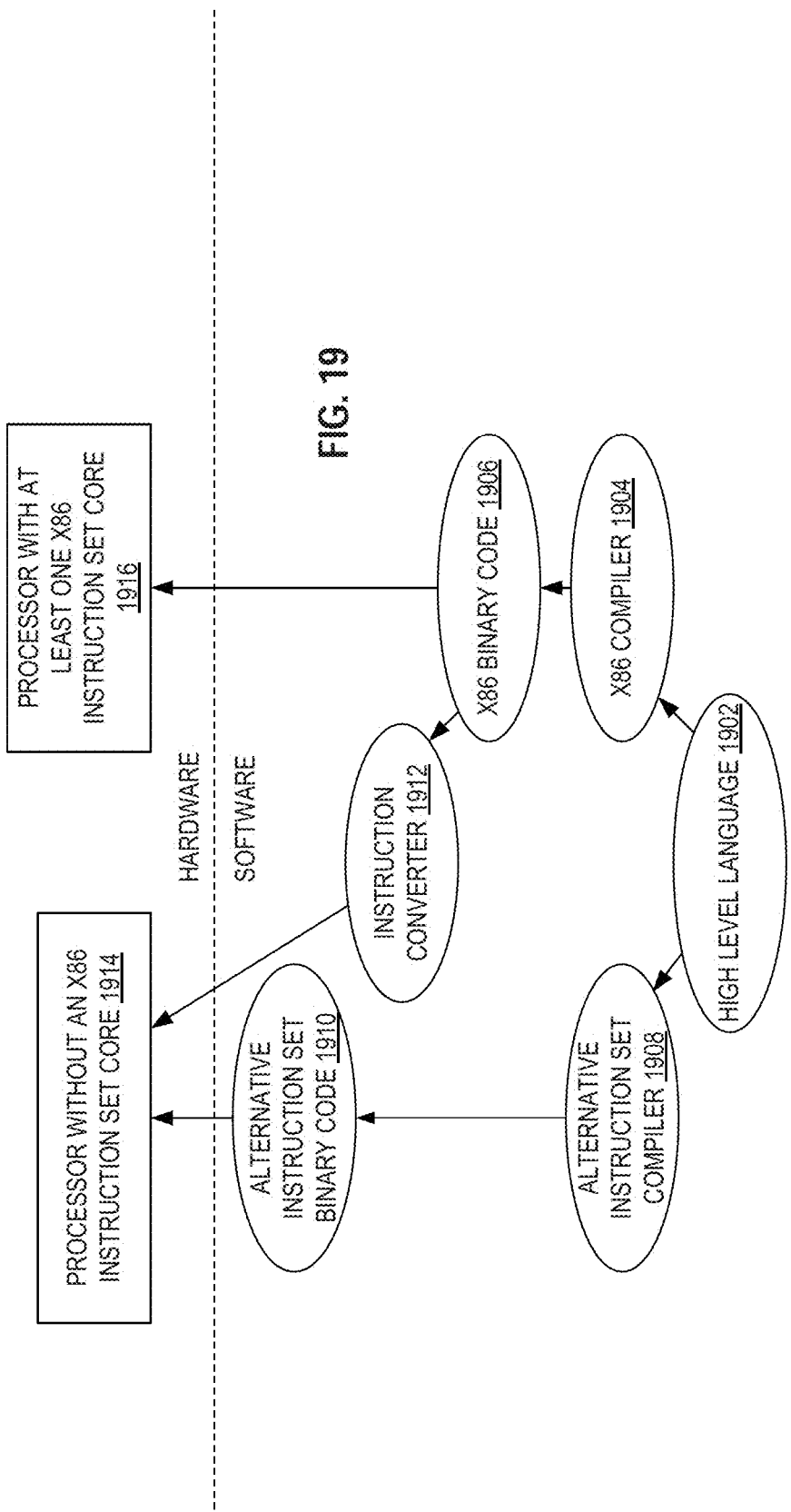

SYSTEMS, APPARATUSES, AND METHODS FOR BROADCAST ARITHMETIC OPERATIONS

FIELD OF INVENTION

The field of invention relates generally to computer processor architecture, and, more specifically, to instructions which when executed cause a particular result.

BACKGROUND

Vectorization of sparse update pattern using a conflict detection package has its limitations. Consider an example code of sparse update:

```
for(i=0; i<N; i++){
    A[idx[i]] += B[i]
}
```

This loop cannot be vectorized with a straightforward approach because it may have potential data dependencies when idx[i] has equal values on different iterations of the loop (referencing to the same memory address).

A conventional way to vectorize the loop is to check for conflicts of indexes with a conflict instruction that generates a result of comparing each index in a vector to each other, and based on this result values are loaded from B[ ] to a vector, permuted, accumulated, and stored to A[ ]. Accumulation is usually done in an inner while loop by permuting values based on a special permute control, which is generated based on the conflict result. This process is iterative and repeated as shown below:

```
zmm_A = Gather (A + zmm_index);
zmm1 = VCONFLICT(zmm_index);
zmm_control = generate_perm_control(zmm1);
mask_completion = full_mask;
while(mask_completion!=0){
    mask_todo = compute_new_mask_todo
      (mask_completion, mask_todo)
    zmm_values = Permute(zmm_values, zmm_control)
    zmm_res = Add(zmm_res, zmm_values)
    mask_todo = compute_new_mask_completion
      (mask_completion, mask_todo)
}
zmm_A = VADD(zmm_A, zmm_res);
Scatter (A, zmm_A, zmm_index);
```

The body and number of iterations of the inner while loop vary depending on the instruction set available and algorithm implementation. For example, if there are 16 equal indexes (corner case), then a simple algorithm implies 15 permutations and 15 additions.

BRIEF DESCRIPTION OF THE DRAWINGS

The present invention is illustrated by way of example and not limitation in the figures of the accompanying drawings, in which like references indicate similar elements and in which:

FIG. 1 illustrates an embodiment of an execution of a broadcast add instruction after a conflict instruction;

FIG. 2(A) illustrates an embodiment of an execution of a broadcast add instruction after a conflict instruction;

FIG. 2(B) illustrates an example of a triangle mask;

FIG. 10A is a block diagram illustrating an exemplary specific vector friendly instruction format according to embodiments of the invention;

FIG. 10B is a block diagram illustrating the fields of the specific vector friendly instruction format 1000 that make up the full opcode field 974 according to one embodiment of the invention;

FIG. 10C is a block diagram illustrating the fields of the specific vector friendly instruction format 1000 that make up the register index field 944 according to one embodiment of the invention;

FIG. 11 is a block diagram of a register architecture 1100 according to one embodiment of the invention;

FIG. 12A is a block diagram illustrating both an exemplary in-order pipeline and an exemplary register renaming, out-of-order issue/execution pipeline according to embodiments of the invention;

FIG. 12B is a block diagram illustrating both an exemplary embodiment of an in-order architecture core and an exemplary register renaming, out-of-order issue/execution architecture core to be included in a processor according to embodiments of the invention;

FIGS. 13A-B illustrate a block diagram of a more specific exemplary in-order core architecture, which core would be one of several logic blocks (including other cores of the same type and/or different types) in a chip;

FIG. 19 is a block diagram contrasting the use of a software instruction converter to convert binary instructions in a source instruction set to binary instructions in a target instruction set according to embodiments of the invention.

DETAILED DESCRIPTION

Figure 3:
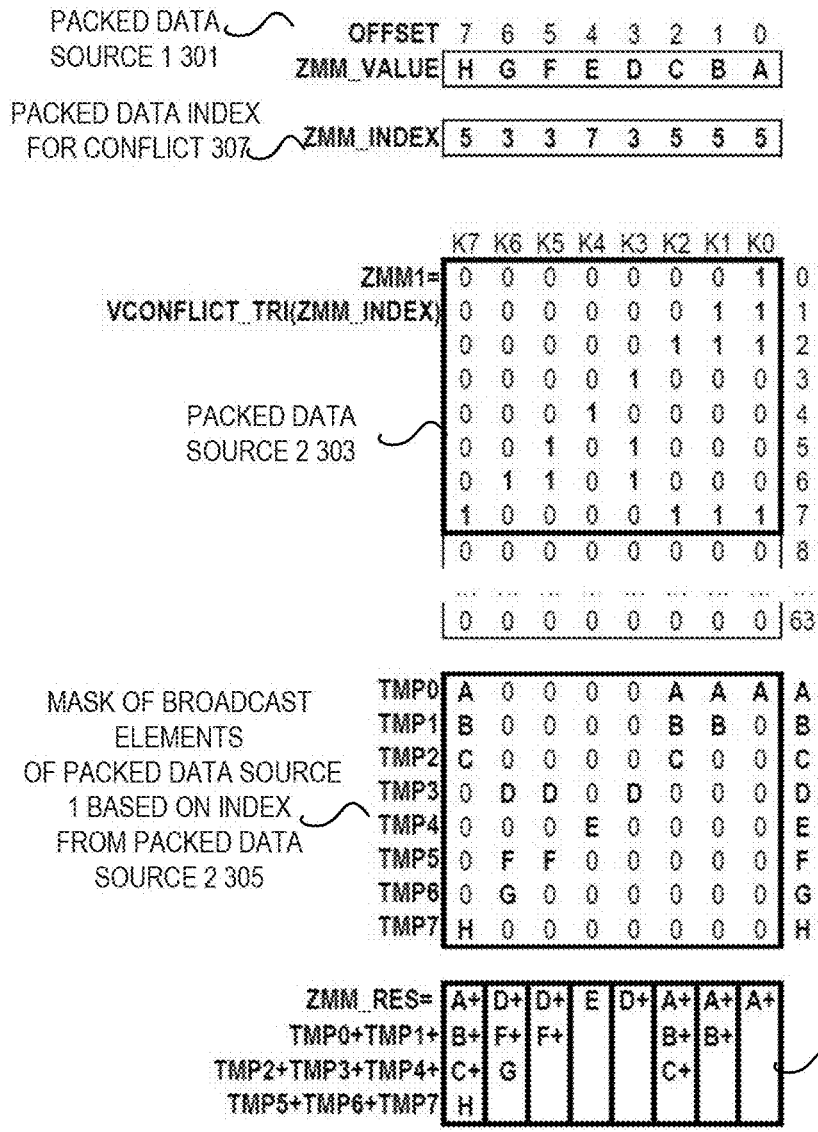
FIG. 3 illustrates an embodiment of an execution of a broadcast add instruction after a conflict instruction.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Unfortunately, typical solutions to the vectorization of a sparse update pattern necessarily have this loop with permutations and mask computations. The most problematic cases are with a large number of conflicts, which may result in slower code than scalar execution. Detailed herein are embodiments of an instruction to broadcast values to a set of temporal vectors with zeroing unset elements, and then do a reduction (addition) of all temporal vectors to a single one. For example, in the above code, the set of masks generated by the conflict instruction are used for sparse reduction operation to a set of temporal vectors with zeroing unset elements.

Some exemplary advantage of using this instruction in a sparse update pattern may include, but are not limited to: no permutations; no overhead for generating permute control; no overhead for mask computations; and/or no inner while loop at all. The entire while loop can be replaced by a single instruction detailed herein.

Detailed herein are embodiments a broadcast arithmetic instruction. The execution of this instruction causes an execution circuit (execution unit) to perform an arithmetic operation on of broadcasted packed data elements of a first source and store the result of each of the sums in a destination. In some embodiments, the packed data elements of the first source to be broadcast are dictated by values of packed data elements (a mask) stored in a second source. In other embodiments, the packed data elements of the first source to be subjected to the arithmetic are dictated by values of packed data elements (the mask) stored in a second source. For example, for each packed data element position of the destination operand, data from each bit position of corresponding packed data element of the second source operand is used as an index into a packed data element position of the first source operand, a sum of each value from each indexed packed data element of the first source operand is generated, and the sum is stored into the packed data element position of the destination operand. In some embodiments, an initial value from the destination is another input used in the arithmetic operation. As such, an improvement to a computer (processor) itself is described. Note for some arithmetic operations (e.g., add), when using the mask, a zero is used in place of a packed data element not used, but for other arithmetic operations (e.g., multiplication), a one is used in place of a packed data element not used. Which approach zeroing or one, may be set by the opcode of the instruction.

With this instruction, the algorithm for vectorizing a sparse update pattern looks like:

```
zmm_A = Gather (A + zmm_index)
zmm_mask = VCONFLICT_SQR(zmm_index)
/*all-to-all check including self- check, this is
a set of masks determining elements in
groups of unique indexes */
zmm_res = BROADCASTADD
(zmm_mask, zmm_values)
/*do sum i=0..KL-1 of
broadcasted (zeroing mode) of zmm_values[i]
with a mask zmm_mask[i] */
zmm_A = VADD(zmm_A, zmm_res) //
add result to zmm_A
Scatter (A, zmm_A, zmm_index) //
perform scatter without a mask
```

Figure 1:
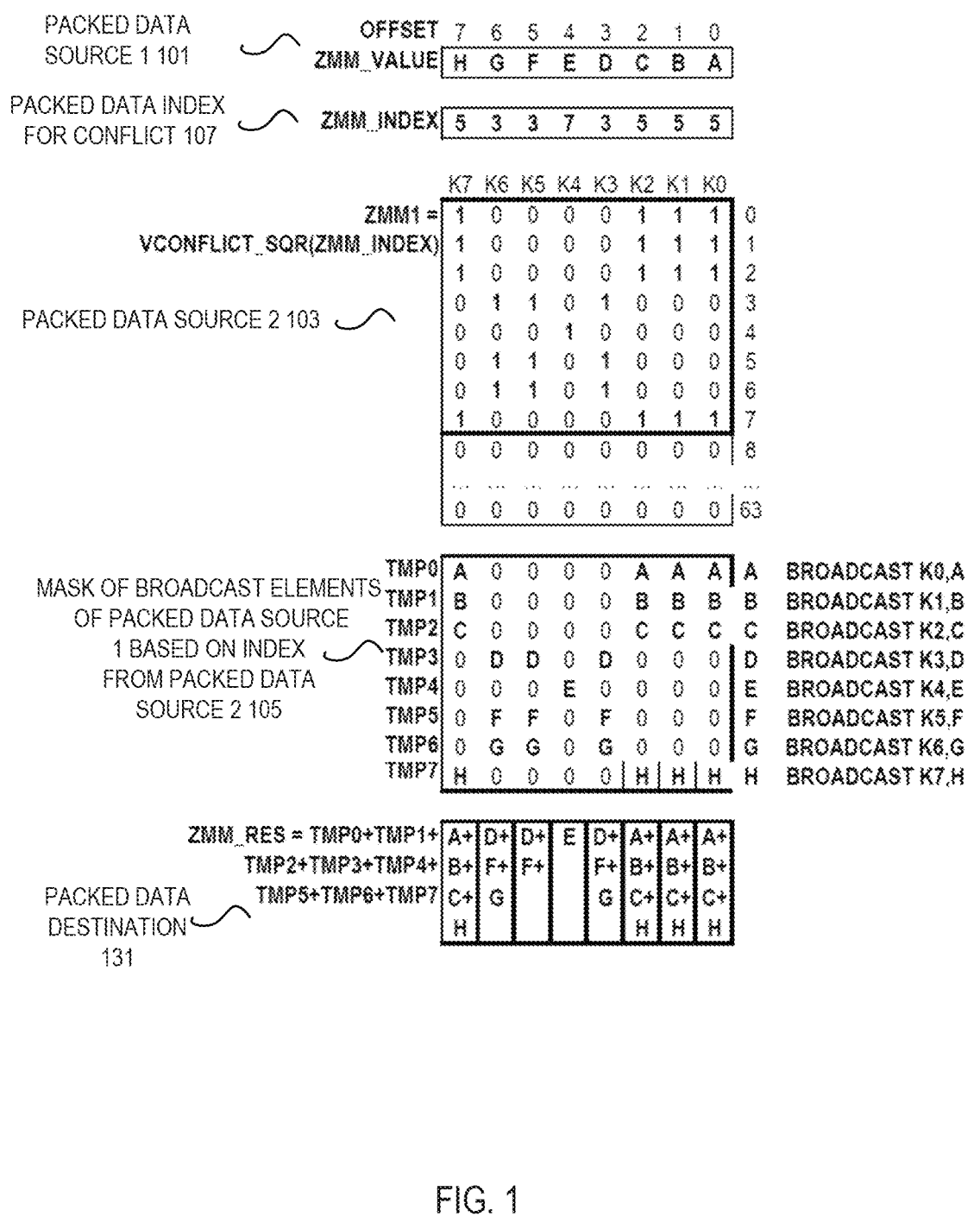

FIG. 1 illustrates an embodiment of an execution of a broadcast add instruction after a conflict instruction. Note that each vertical column is the same lane of a vector register. Additionally, while an add (summation) is shown, any arithmetic operation may be performed. As shown, a packed data source 1 101 will supply packed data elements to be added. The "offset" refers to each packed data element position of the packed data source 1 101. In this example, there are 8 (KL=8) packed data elements.

A packed data index 107 for is a source operand for a conflict instruction. The result of the conflict instruction generates a packed data source 2 103 which is used to index packed data element positions of the packed data source 1 101. Using the index, a plurality of temporary values (tmp0-7) are generated from broadcasted packed data elements from the packed data source 1 101.

At each packed data element position of the packed data destination 131, a sum of the broadcasted elements at that position are stored.

Figure 2A:
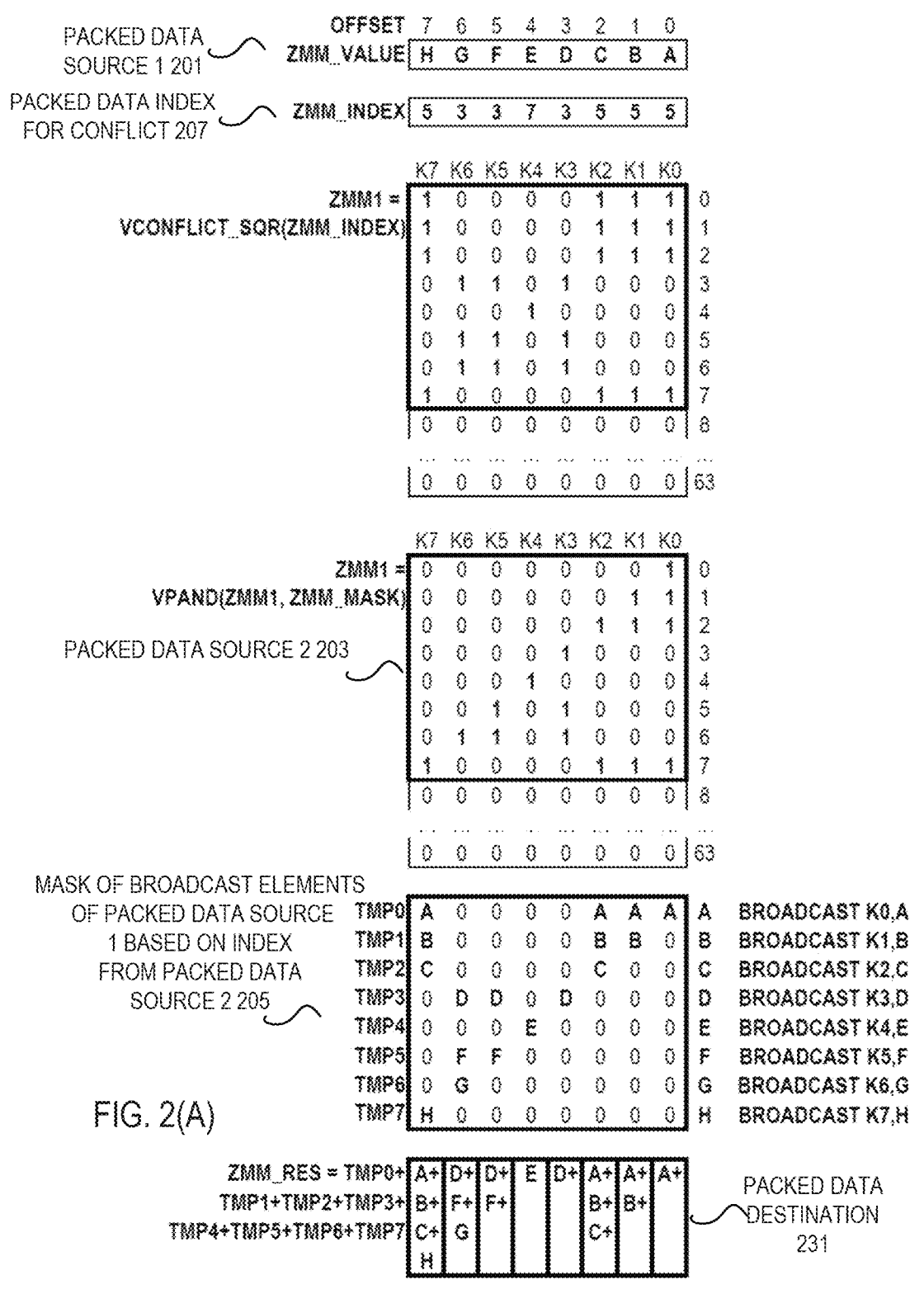

FIG. 2(A) illustrates an embodiment of an execution of a broadcast add instruction after a conflict instruction. Note that each vertical column is the same lane of a vector register. Additionally, while an add (summation) is shown, any arithmetic operation may be performed. As shown, a packed data source 2 201 will supply packed data elements to be added. The "offset" refers to each packed data element position of the packed data source 1 201. In this example, there are 8 (KL=8) packed data elements.

A packed data index 207 is a source operand for a conflict instruction. The result of the conflict instruction is passed used as a source of an AND instruction along with a triangle mask (ZMM_MASK in FIG. 2(B)). The result of the AND instruction is a packed data source 2 203 which is used to index packed data element positions of the packed data source 1 201. Using the index, a plurality of temporary values (tmp0-7) to add are generated from broadcasted packed data elements from the packed data source 1 201.

At each packed data element position of the packed data destination 231, a sum of the broadcasted elements at that position are stored.

FIG. 3 illustrates an embodiment of an execution of a broadcast add instruction after a conflict instruction. Note that each vertical column is the same lane of a vector register. Additionally, while an add (summation) is shown, any arithmetic operation may be performed. As shown, a packed data source 2 301 will supply packed data elements to be added. The "offset" refers to each packed data element position of the packed data source 1 301. In this example, there are 8 (KL=8) packed data elements.

A packed data index 307 is a source operand for a triangle conflict instruction. The result of the conflict instruction is passed used as a source of a triangle conflict instruction. The triangle conflict performs a comparison of each element to all leftmost elements. The result of the triangle conflict instruction is a packed data source 2 303 which is used to index packed data element positions of the packed data source 1 301. Using the index, a plurality of temporary values (tmp0-7) to add are generated from broadcasted packed data elements from the packed data source 1 301.

At each packed data element position of the packed data destination 331, a sum of the broadcasted elements at that position are stored.

Figure 4:
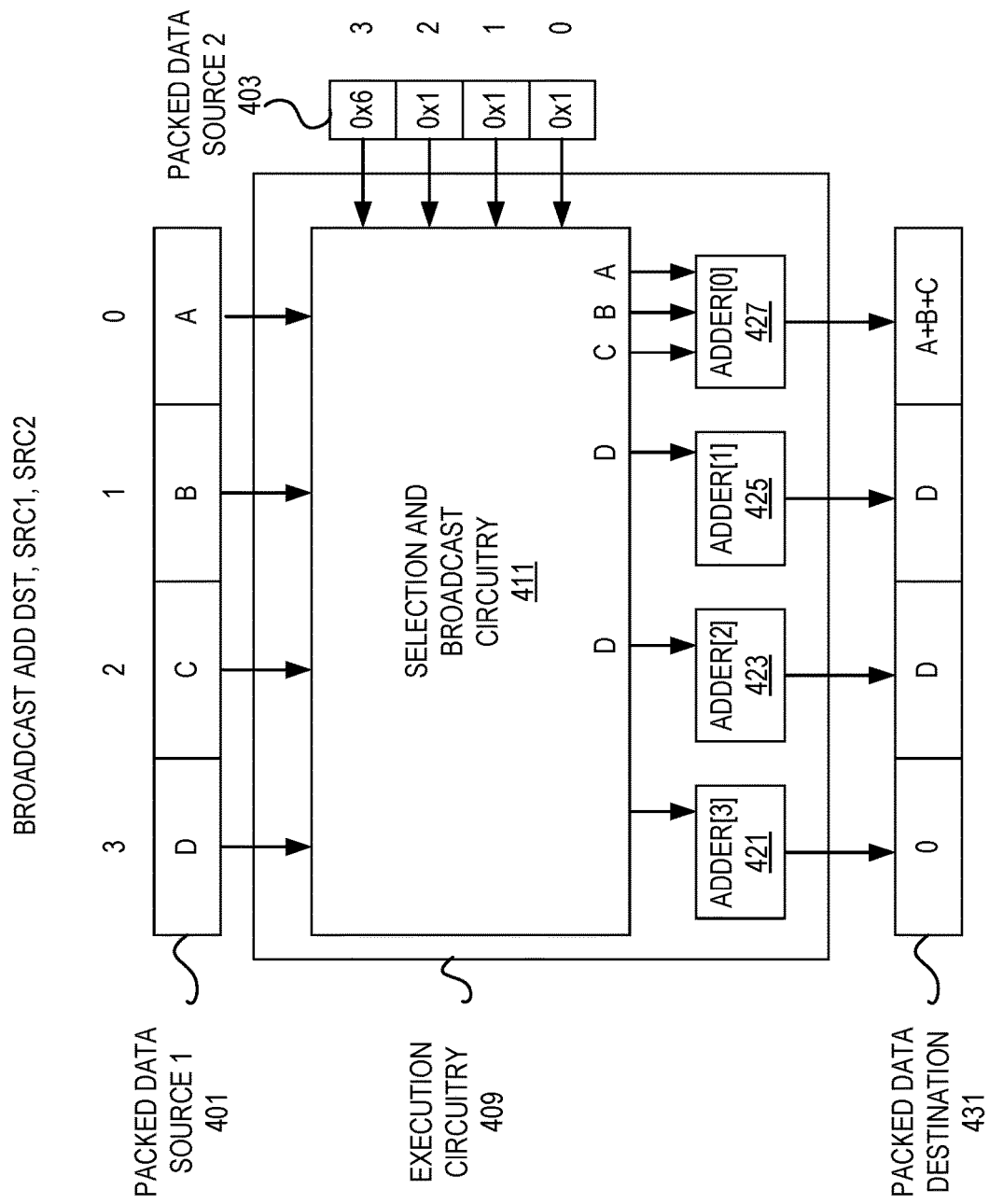
FIG. 4 illustrates an exemplary execution of a broadcast add instruction. Of course, other arithmetic operations may be performed.

FIG. 4 illustrates an exemplary execution of a broadcast add instruction. Of course, other arithmetic operations may be performed. While this illustration is in little endian format, the principles discussed herein work in big endian format. Further, in this example, each packed data element position of the packed data destination 431 does not include an original value of stored in that position. The broadcast add instruction includes fields for a destination (packed data destination (DST) 431) and two sources (packed data source 1 (SRC1) 401 and packed data source 2 (SRC2) 403).

Packed data source 1 401 includes four packed data elements (shown at packed data element positions 0-3). Depending upon the implementation, packed data source 1 401 is a packed data register (e.g., a XMM, YMM, ZMM, vector, SIMD, D, S, etc. register), or a memory location.

Packed data source 2 403 includes four packed data elements (shown at packed data element positions 0-3). Depending upon the implementation, packed data source 2 403 is a packed data register (e.g., a XMM, YMM, ZMM, vector, SIMD, D, S, etc. register), or a memory location.

The two packed data sources 401, 403 are fed into execution circuitry 409 to be operated on. In particular, execution circuitry 409 performs sums broadcasted packed data elements of a first packed data source 401 and stores the result of the sums in packed data destination 431. Wherein in some embodiments, which packed data elements of the first packed data source 401 are broadcast are dictated by values of packed data elements (a mask) stored in a second packed data source 403. Selection and broadcast circuitry 411 uses the packed data elements of the packed data source 403 to select how broadcasted packed data elements of packed data source 1 401 are to be used by one or more adder circuits 421, 423, 425, 427. Note while a plurality of adders is shown, in some embodiments, the same adder is reused. Adders 421, 423, 425, 427 add its input packed data element values and the output of each adder 421, 423, 425, 427 is placed into a corresponding packed data element position of the packed data destination 431. In some embodiments, selection and broadcast circuitry 411 is a configurable crossbar.

As such, as illustrated, for each packed data element position of packed data destination operand 431, there is an adder that takes in packed data elements from packed data source 1 401 based on the index provided by the packed data elements of packed data source 2 403. For example, in packed data element position 0 of packed data source 2 403 the value is 0x1. As such, only one bit position (the least significant) is set in this element. This set bit indicates that for packed data element position 0 of packed data source 1 401 that the value in this position (A) is to be added by only one adder (in this example, that adder corresponds to adder [0] 427 which is the adder in the same "position" as the set bit). In packed data element position 3 of packed data source 2 403 the value is 0x6. As such, only 2 bits are set in this element (0b0110). These set bits indicate that for packed data element position 3 of packed data source 1 401 that the value in this position (D) is to be added by the two adders that correspond to the set bit positions (in this example, those adders corresponds to adder[1] 425 and adder [2] 423). The results of the adders are stored into a corresponding packed data element position of the packed data destination 431 as shown.

Figure 5:
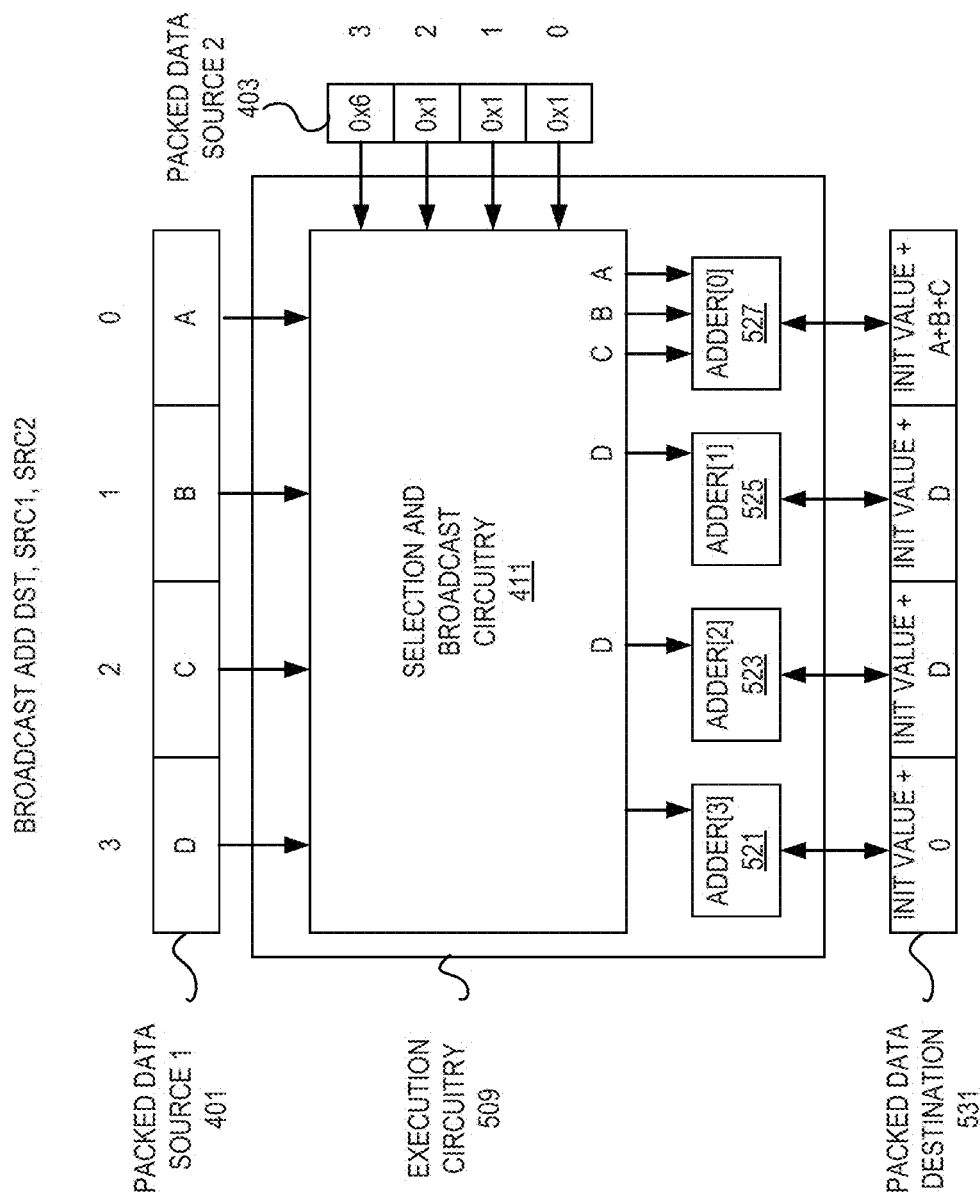
FIG. 5 illustrates an exemplary execution of a broadcast add instruction.

FIG. 5 illustrates an exemplary execution of a broadcast add instruction. While this illustration is in little endian format, the principles discussed also work in big endian format. Further, in this example, each packed data element position of the packed data destination 531 does not include an original value of stored in that position. The broadcast add instruction includes fields for a destination (packed data destination (DST) 531) and two sources (packed data source 1 (SRC1) 401 and packed data source 2 (SRC2) 403).

Packed data source 1 401 includes four packed data elements (shown at packed data element positions 0-3). Depending upon the implementation, packed data source 1 401 is a packed data register (e.g., a XMM, YMM, ZMM, vector, SIMD, D, S, etc. register), or a memory location.

Packed data source 2 403 includes four packed data elements (shown at packed data element positions 0-3). Depending upon the implementation, packed data source 2 403 is a packed data register (e.g., a XMM, YMM, ZMM, vector, SIMD, D, S, etc. register), or a memory location.

The two packed data sources 401, 403 are fed into execution circuitry 509 to be operated on. In particular, execution circuitry 509 perform sums of broadcasted packed data elements of a first packed data source 401 and stores the result of the sums in packed data destination 531. In some embodiments, the packed data elements of the first packed data source 401 are broadcast are dictated by values of packed data elements (a mask) stored in a second packed data source 403. In other embodiments, the packed data elements of the first packed data source 401 are selected after broadcast as dictated by values of packed data elements (a mask) stored in a second packed data source 403. Selection and broadcast circuitry 411 uses the packed data elements of the packed data source 403 to select how packed data elements of packed data source 1 401 are broadcast to one or more adder circuits 521, 523, 525, 527. Note while a plurality of adders is shown, in some embodiments, the same adder is reused. Adders 521, 523, 525, 527 add its input packed data element values and a data element from a corresponding packed element position of packed data destination 531, and the output of each adder 521, 523, 525, 527 is placed into a corresponding packed data element position of packed data destination 531. In some embodiments, selection and broadcast circuitry 411 is a configurable crossbar.

As such, as illustrated, for each packed data element position of packed data destination operand 531, there is an adder that adds in packed data elements from packed data source 1 401 based on the index provided by the packed data elements of packed data source 2 403, and also takes in an initial value from packed data destination 531. For example, in packed data element position 0 of packed data source 2 403 the value is 0x1. As such, only one bit position (the least significant) is set in this element. This set bit indicates that for packed data element position 0 of packed data source 1 401 that the value in this position (A) is to be used by only one adder (in this example, that adder corresponds to adder[0] 527 which is the adder in the same "position" as the set bit). In packed data element position 3 of packed data source 2 403 the value is 0x6. As such, only 2 bits are set in this element (0b0110). These set bits indicate that for packed data element position 3 of packed data source 1 401 that the value in this position (D) is to be used by the two adders that correspond to the set bit positions (in this example, those adders corresponds to adder[1] 525 and adder [2] 523). The results of the adders are added to a corresponding packed data element position of the packed data destination 531 as shown.

Figure 6:
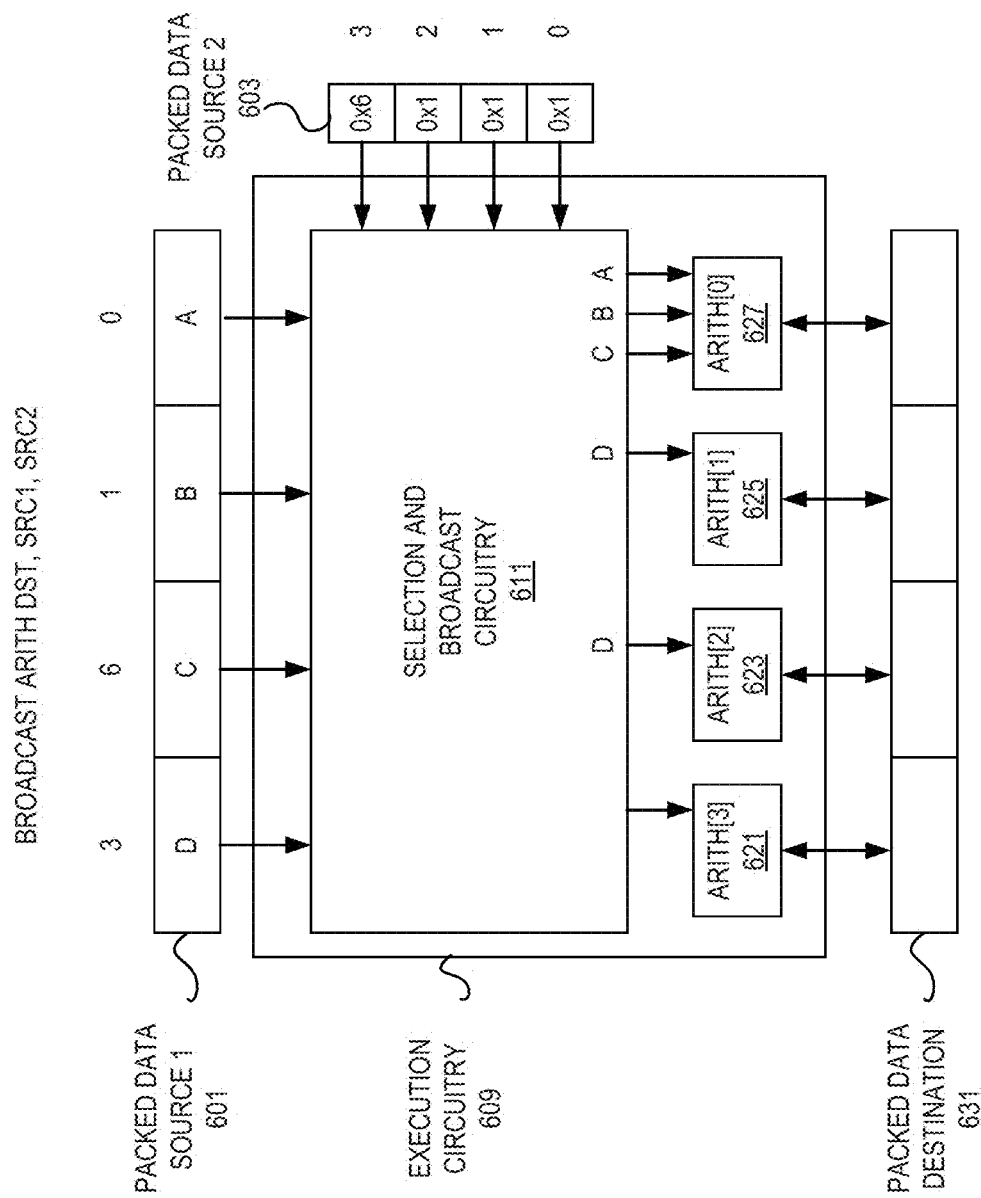
FIG. 6 illustrates an exemplary execution of a broadcast arith instruction.

FIG. 6 illustrates an exemplary execution of a broadcast arith instruction. While this illustration is in little endian format, the principles discussed also work in big endian format. Further, in this example, each packed data element position of the packed data destination 631 does not include an original value of stored in that position. The broadcast arith instruction includes fields for a destination (packed data destination (DST) 631) and two sources (packed data source 1 (SRC1) 601 and packed data source 2 (SRC2) 603).

Packed data source 1 601 includes four packed data elements (shown at packed data element positions 0-3). Depending upon the implementation, packed data source 1 601 is a packed data register (e.g., a XMM, YMM, ZMM, vector, SIMD, D, S, etc. register), or a memory location.

Packed data source 2 603 includes four packed data elements (shown at packed data element positions 0-3). Depending upon the implementation, packed data source 2 603 is a packed data register (e.g., a XMM, YMM, ZMM, vector, SIMD, D, S, etc. register), or a memory location.

The two packed data sources 601, 603 are fed into execution circuitry 609 to be operated on. In particular, execution circuitry 609 performs arithmetic operations on selected broadcasted packed data elements of a first packed data source 601 and stores the results in packed data destination 631. In some embodiments, the packed data elements of the first packed data source 601 are broadcast are dictated by values of packed data elements (a mask) stored in a second packed data source 603. In some embodiments, the packed data elements of the first packed data source 601 are broadcast and then selected as dictated by values of packed data elements (a mask) stored in a second packed data source 603. Selection and broadcast circuitry 611 uses the packed data elements of the packed data source 603 to select how packed data elements of packed data source 1 601 are given to one or more arithmetic circuit circuits 621, 623, 625, 627. Note while a plurality of arithmetic circuits is shown, in some embodiments, the same arithmetic circuit is reused. Arithmetic circuits 621, 623, 625, 627 perform the operation their input packed data element values and a data element from a corresponding packed element position of packed data destination 631, and the output of each arithmetic circuit 621, 623, 625, 627 is placed into a corresponding packed data element position of packed data destination 631. In some embodiments, selection (and broadcast) circuitry 611 is a configurable crossbar.

As such, as illustrated, for each packed data element position of packed data destination operand 631, there is an arithmetic circuit that operates on packed data elements from packed data source 1 601 based on the index provided by the packed data elements of packed data source 2 603. In some embodiments, an initial value from packed data destination 631 is also used in the operation. For example, in packed data element position 0 of packed data source 2 603 the value is 0x1. As such, only one bit position (the least significant) is set in this element. This set bit indicates that for packed data element position 0 of packed data source 1 601 the value in this position (A) is to be used by only one arithmetic circuit (in this example, that arithmetic circuit corresponds to arithmetic circuit[0] 627 which is the arithmetic circuit in the same "position" as the set bit). In packed data element position 3 of packed data source 2 603 the value is 0x6. As such, only 2 bits are set in this element (0b0110). These set bits indicate that for packed data element position 3 of packed data source 1 601 that the value in this position (D) is to be used by the two arithmetic circuits that correspond to the set bit positions (in this example, those arithmetic circuits corresponds to arithmetic circuit[1] 625 and arithmetic circuit [2] 623). The results of the arithmetic circuits are added to a corresponding packed data element position of the packed data destination 631 as shown.

Figure 7:
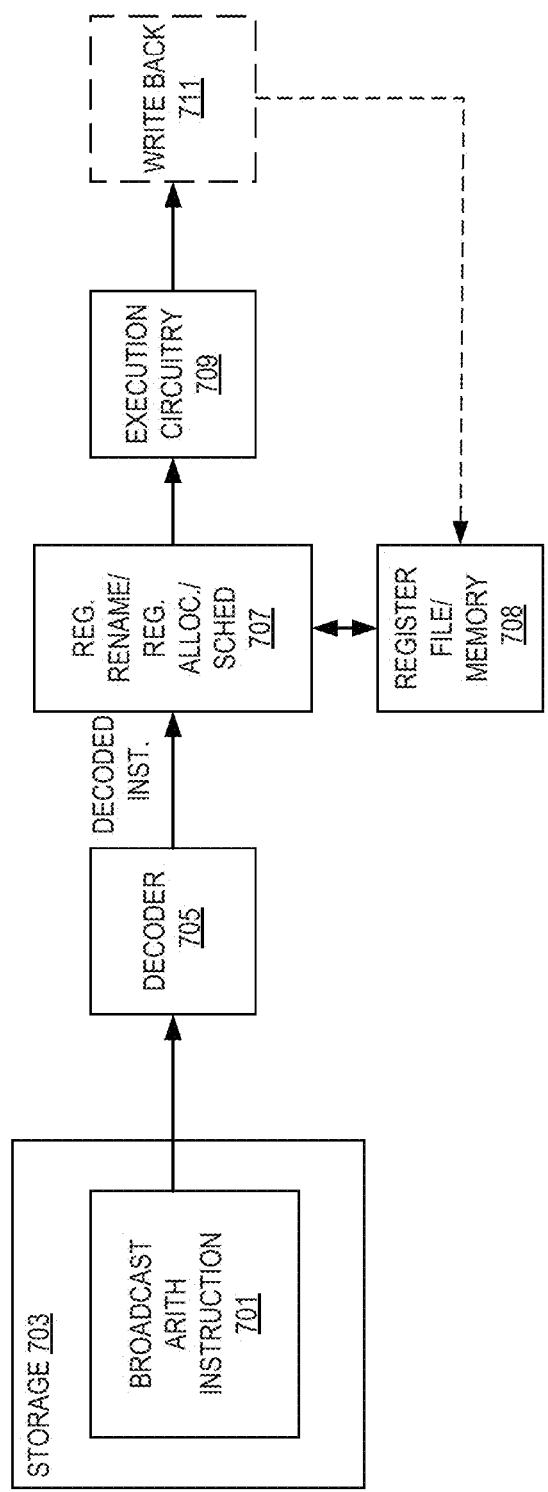
FIG. 7 illustrates an embodiment of hardware to process an instruction such as a broadcast arith instruction.

FIG. 7 illustrates an embodiment of hardware to process an instruction such as a broadcast arith instruction. As illustrated, storage 703 stores a broadcast arith instruction 701 to be executed.

The instruction 701 is received by decode circuitry 705. For example, the decode circuitry 705 receives this instruction from fetch logic/circuitry. The instruction includes fields for an opcode, first and second sources, and a destination. In some embodiments, the sources and destination are registers, and in other embodiments one or more are memory locations. In some embodiments, an opcode or prefix of the instruction 701 includes an indication of data element size {B/W/D/Q} for element sizes of byte, word, doubleword, and quadword.

More detailed embodiments of at least one instruction format will be detailed later. The decode circuitry 705 decodes the instruction into one or more operations. In some embodiments, this decoding includes generating a plurality of micro-operations to be performed by execution circuitry (such as execution circuitry 709). The decode circuitry 705 also decodes instruction prefixes.

In some embodiments, register renaming, register allocation, and/or scheduling circuitry 707 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 708 store data as operands of the instruction to be operated on by execution circuitry 709. Exemplary register types include packed data registers, general purpose registers, and floating point registers.

Execution circuitry 709 executes the decoded instruction. Exemplary detailed execution circuitry was shown in FIGS. 4-6. The execution of the decoded instruction causes the execution circuitry to perform an arithmetic operation on broadcasted packed data elements of a first source and store the result of the arithmetic operation in a destination. In some embodiments, the packed data elements of the first source to be broadcast are dictated by values of packed data elements (a mask) stored in a second source. In other embodiments, the mask is used to dictate which elements are subject to reduction. For example, for each packed data element position of the destination operand, data from each bit position of corresponding packed data element of the second source operand is used as an index into a packed data element position of the first source operand, generate a result of an arithmetic operation (e.g., sum, subtraction, multiplication, division) of each value from each indexed packed data element of the first source operand, and store the result of the arithmetic operation into the packed data element position of the destination operand. In some embodiments, an initial value from the destination is another input used in the operation (e.g., sum generation).

In some embodiments, retirement/write back circuitry 711 architecturally commits the destination register into the registers or memory 708 and retires the instruction.

An embodiment of a format for a broadcast add instruction is BROADCAST ARITH{B/W/D/Q} DSTREG, SRC1, SRC2. In some embodiments, BROADCAST ARITH{B/W/D/Q} is the opcode mnemonic of the instruction. ARITH is the arithmetic function to be performed such as ADD (addition), SUB (subtraction), MUL (multiplication), DIV (division), etc. B/W/D/Q indicates the data element sizes of the sources/destination as byte, word, doubleword, and quadword. In other embodiments, the data element size is a part of a prefix. DSTREG is a field for the packed data destination register operand. SRC1 and SRC2 are fields for the sources such as packed data registers and/or memory.

In some embodiments, the broadcast arith instruction includes a field for a writemask register operand (k) (e.g., BROADCAST ARITH{B/W/D/Q}{k} DSTREG, SRC1, SRC2). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the destination operand. The predicate operand is known as the opmask (writemask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword (int32), double-precision floating-point (float64), integer quadword (int64). The length of a opmask register, MAX_KL, is sufficient to handle up to 64 elements with one bit per element, i.e. 64 bits. For a given vector length, each instruction accesses only the number of least significant mask bits that are needed based on its data type. An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2). a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Figure 8:
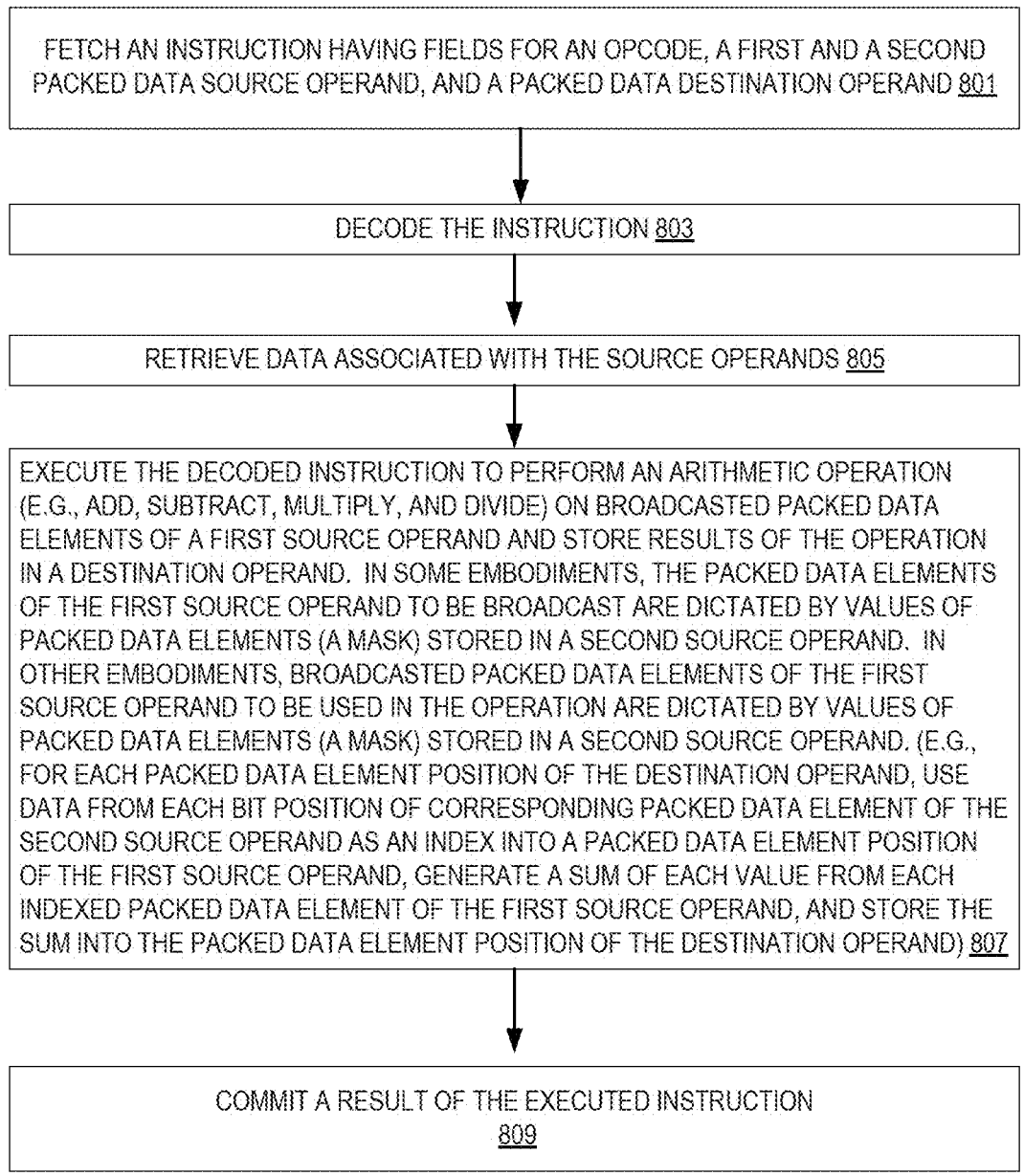
FIG. 8 illustrates an embodiment of method performed by a processor to process a broadcast arithmetic instruction.

FIG. 8 illustrates an embodiment of method performed by a processor to process a broadcast arithmetic instruction. For example, a processor core as shown in FIG. 4-7, a pipeline as detailed below, etc. performs this method.

At 801, an instruction is fetched. For example, a broadcast arith instruction is fetched. The broadcast arith instruction includes fields for an opcode, a first and a second source operand, and a destination operand. In some embodiments, the instruction further includes a field for a writemask. In some embodiments, the instruction is fetched from an instruction cache. The source operands and destination operand are packed data. The opcode indicates which operation is to be performed.

The fetched instruction is decoded at 803. For example, the fetched broadcast add instruction is decoded by decode circuitry such as that detailed herein.

Data values associated with the source operands of the decoded instruction are retrieved at 805. For example, when one or more of the source operands are memory operands, the data from the indicated memory location is retrieved.

At 807, the decoded instruction is executed by execution circuitry (hardware) such as that detailed herein. For the broadcast add instruction, the execution will cause execution circuitry to perform an arithmetic operation on broadcasted packed data elements of the first source operand and store the results of each sum in the destination operand. In some embodiments, the packed data elements of the first source operand to be broadcast are dictated by values of packed data elements (a mask) stored in a second source operand. In other embodiments, the broadcasted packed data elements of the first source operand to be selected for the operation are dictated by values of packed data elements (a mask) stored in a second source operand. For example, for each packed data element position of the destination operand, data from each bit position of corresponding packed data element of the second source operand is used as an index into a packed data element position of the first source operand, a result the operation of each value from each indexed packed data element of the first source operand, and the result is stored into the packed data element position of the destination operand. In some embodiments, an initial value from the destination is another input used in the sum generation.

In some embodiments, the instruction is committed or retired at 809.

An example of pseudocode for broadcast add is as follows:

```
BROADCASTADD dest, src1, src2
tmp[KL-1:0]=0
    for(i=0; i<KL; i++){
        kmask[KL-1:0] = src2[i][KL-1:0]
        //src2[i] is a vector of KL bits
        value = src1[i]
        for(j=0; j<KL; j++){
            if(kmask[j]) tmp[j] += value
        }
    }
dest[KL-1:0] = tmp[KL-1:0]
```

KL is number of elements given for reduction in the input source 1 vector. While the reduction is shown as a serialized sequence of accumulation in one temporal vector, but in other implementation it can be done through KL temporal vectors (thus, broadcast operations are parallelized) with reduction performed by a tree.

Examples of embodiments are detailed below.

1. An apparatus comprising a decoder to decode an instruction having fields for a first and a second source operand, and a destination operand, and execution circuitry to execute the decoded instruction to perform an arithmetic operation on broadcasted packed data elements of the first source operand and store results of each arithmetic operation in the destination operand, wherein the packed data elements of the first source operand to be broadcast are dictated by values of packed data elements stored in a second source operand, wherein the arithmetic operation is defined by the instruction.

2. The apparatus of example 1, wherein the first source operand is a packed data register and the second source operand is a memory location.

3. The apparatus of example 1, wherein the first source operand is a packed data register and the second source operand is a packed data register.

4. The apparatus of example 1, wherein the values of packed data elements stored in the second source operand form a mask.

5. The apparatus of example 1, wherein to execute the decoded instruction, the execution circuitry is to, for each packed data element position of the destination operand, use data from each bit position of corresponding packed data element of the second source operand as an index into a packed data element position of the first source operand, generate a result of the arithmetic operation of each value from each indexed packed data element of the first source operand, and store the result into the packed data element position of the destination operand.

6. The apparatus of example 1, wherein the arithmetic operation is one of addition, subtraction, multiplication, and division.

7. The apparatus of example 1, wherein the apparatus to translate the instruction from a first instruction set into an instruction of a second instruction set prior to a decode, wherein the instruction to be decoded is of the second instruction set.

8. An method comprising decoding an instruction having fields for a first and a second source operand, and a destination operand, and executing the decoded instruction to sum broadcasted packed data elements of the first source operand and store results of each sum in the destination operand, wherein the packed data elements of the first source operand to be broadcast are dictated by values of packed data elements stored in a second source operand.

9. The method of example 8, wherein the first source operand is a packed data register and the second source operand is a memory location.

10. The method of example 8, wherein the first source operand is a packed data register and the second source operand is a packed data register.

11. The method of example 8, wherein the values of packed data elements stored in the second source operand form a mask.

12. The method of example 8, wherein for each packed data element position of the destination operand, using data from each bit position of corresponding packed data element of the second source operand as an index into a packed data element position of the first source operand, generating a sum of each value from each indexed packed data element of the first source operand, and storing the sum into the packed data element position of the destination operand.

13. The method of example 8, wherein an initial value from the destination is another input used in the sum generation.

14. The method of example 8, further comprising: translating the instruction from a first instruction set into an instruction of a second instruction set prior to a decode, wherein the instruction to be decoded is of the second instruction set.

15. A non-transitory machine-readable medium storing an instruction which when executed by a processor causes the processor to perform a method, the method comprising decoding an instruction having fields for a first and a second source operand, and a destination operand, and executing the decoded instruction to sum broadcasted packed data elements of the first source operand and store results of each sum in the destination operand, wherein the packed data elements of the first source operand to be broadcast are dictated by values of packed data elements stored in a second source operand.

16. The non-transitory machine-readable medium of example 15, wherein the first source operand is a packed data register and the second source operand is a memory location.

17. The non-transitory machine-readable medium of example 15, wherein the first source operand is a packed data register and the second source operand is a packed data register.

18. The non-transitory machine-readable medium of example 15, wherein the values of packed data elements stored in the second source operand form a mask.

19. The non-transitory machine-readable medium of example 15, wherein for each packed data element position of the destination operand, using data from each bit position of corresponding packed data element of the second source operand as an index into a packed data element position of the first source operand, generating a sum of each value from each indexed packed data element of the first source operand, and storing the sum into the packed data element position of the destination operand.

20. The non-transitory machine-readable medium of example 15, wherein an initial value from the destination is another input used in the sum generation.

21. The non-transitory machine-readable medium of example 15, further comprising: translating the instruction from a first instruction set into an instruction of a second instruction set prior to a decode, wherein the instruction to be decoded is of the second instruction set.

22. An apparatus comprising decoder means for decoding an instruction having fields for a first and a second source operand, and a destination operand, and execution means for executing the decoded instruction to perform an arithmetic operation on broadcasted packed data elements of the first source operand and store results of each arithmetic operation in the destination operand, wherein the packed data elements of the first source operand to be broadcast are dictated by values of packed data elements stored in a second source operand, wherein the arithmetic operation is defined by the instruction.

23. The apparatus of example 22, wherein the first source operand is a packed data register and the second source operand is a memory location.

24. The apparatus of example 22, wherein the first source operand is a packed data register and the second source operand is a packed data register.

25. The apparatus of any of examples 22-24, wherein the values of packed data elements stored in the second source operand form a mask.

26. The apparatus of any of examples 22-25, wherein to execute the decoded instruction, the execution means is to, for each packed data element position of the destination operand, use data from each bit position of corresponding packed data element of the second source operand as an index into a packed data element position of the first source operand, generate a result of the arithmetic operation of each value from each indexed packed data element of the first source operand, and store the result into the packed data element position of the destination operand.

27. The apparatus of any of examples 22-26, wherein the arithmetic operation is one of addition, subtraction, multiplication, and division.

28. The apparatus of any of examples 22-27, wherein the apparatus to translate the instruction from a first instruction set into an instruction of a second instruction set prior to a decode, wherein the instruction to be decoded is of the second instruction set.

The figures below detail exemplary architectures and systems to implement embodiments of the above. In some embodiments, one or more hardware components and/or instructions described above are emulated as detailed below, or implemented as software modules.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
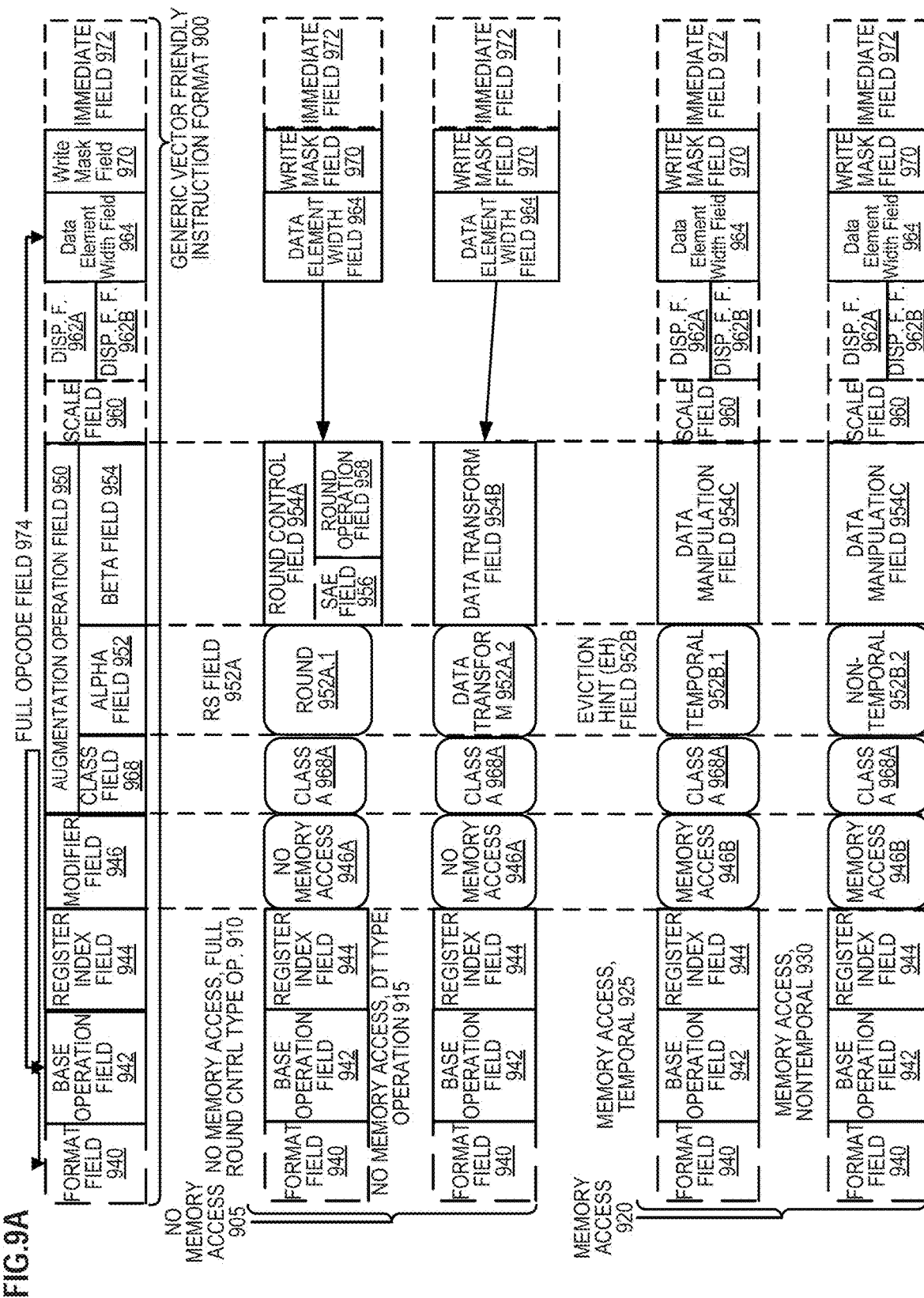
FIGS. 9A-9B are block diagrams illustrating a generic vector friendly instruction format and instruction templates thereof according to embodiments of the invention.
Figure 9B:
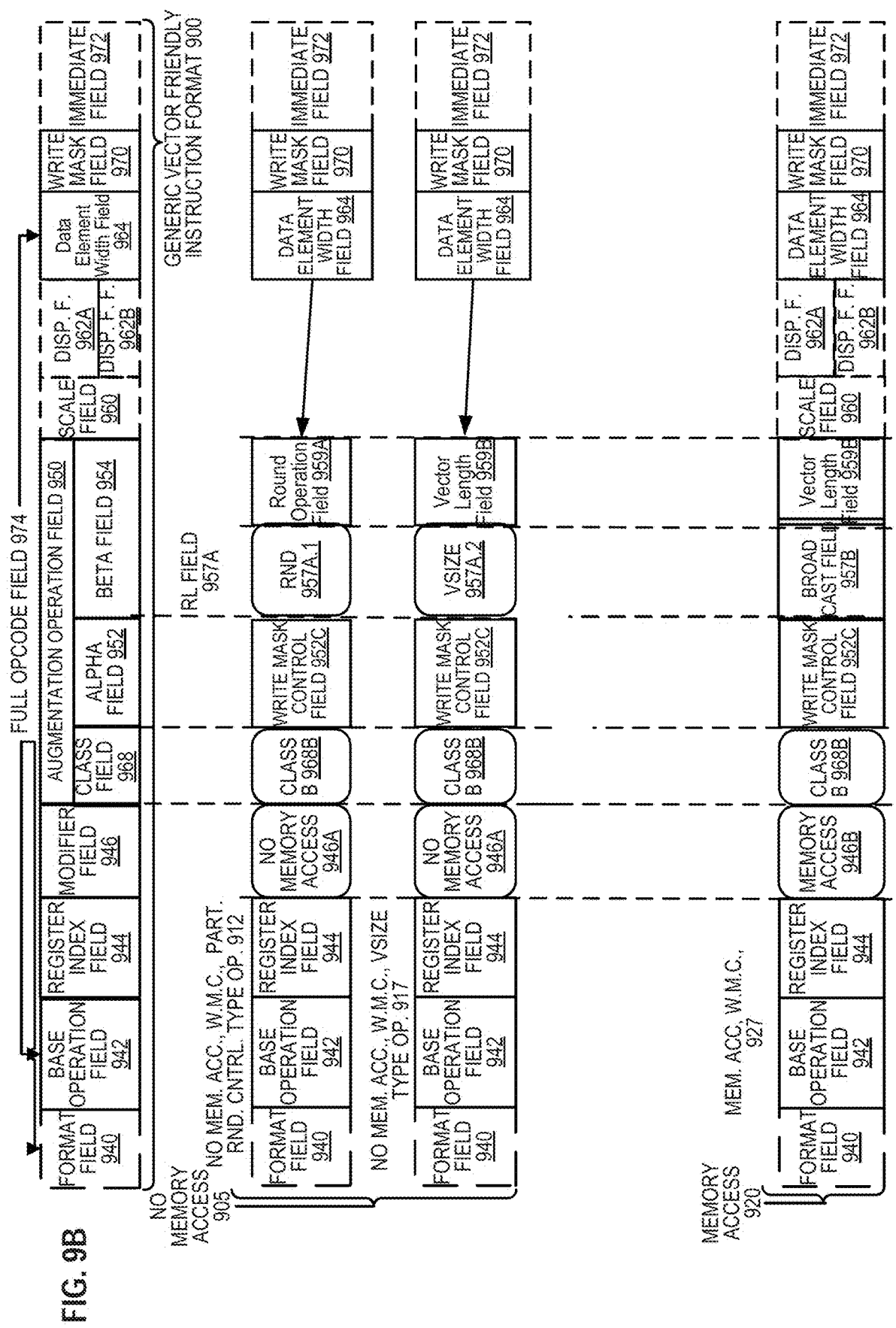

FIGS. 9A-9B are block diagrams illustrating a generic vector friendly instruction format and instruction templates thereof according to embodiments of the invention. FIG. 9A is a block diagram illustrating a generic vector friendly instruction format and class A instruction templates thereof according to embodiments of the invention; while FIG. 9B is a block diagram illustrating the generic vector friendly instruction format and class B instruction templates thereof according to embodiments of the invention. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the invention, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*index+base$).

Displacement Field 962A—its content is used as part of memory address generation (e.g., for address generation that uses $2^{scale}*index+base+displacement$).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the invention are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the invention the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the invention where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the invention where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10A is a block diagram illustrating an exemplary specific vector friendly instruction format according to embodiments of the invention. FIG. 10A shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10A map are illustrated.

It should be understood that, although embodiments of the invention are described with reference to the specific vector friendly instruction format 1000 in the context of the generic vector friendly instruction format 900 for illustrative purposes, the invention is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the invention is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the invention).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]-R), EVEX.X bit field (EVEX byte 1, bit [6]-X), and 957BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]-mmmm)—its content encodes an implied leading opcode byte (0F, 0F 38, or 0F 3).

Data element width field 964 (EVEX byte 2, bit [7]-W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]-U)—If EVEX.U=0, it indicates class A or EVEX.U0; if EVEX.U=1, it indicates class B or EVEX.U1.

Prefix encoding field 1025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 954 (EVEX byte 3, bits [6:4]-SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one embodiment of the invention. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one embodiment of the invention. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
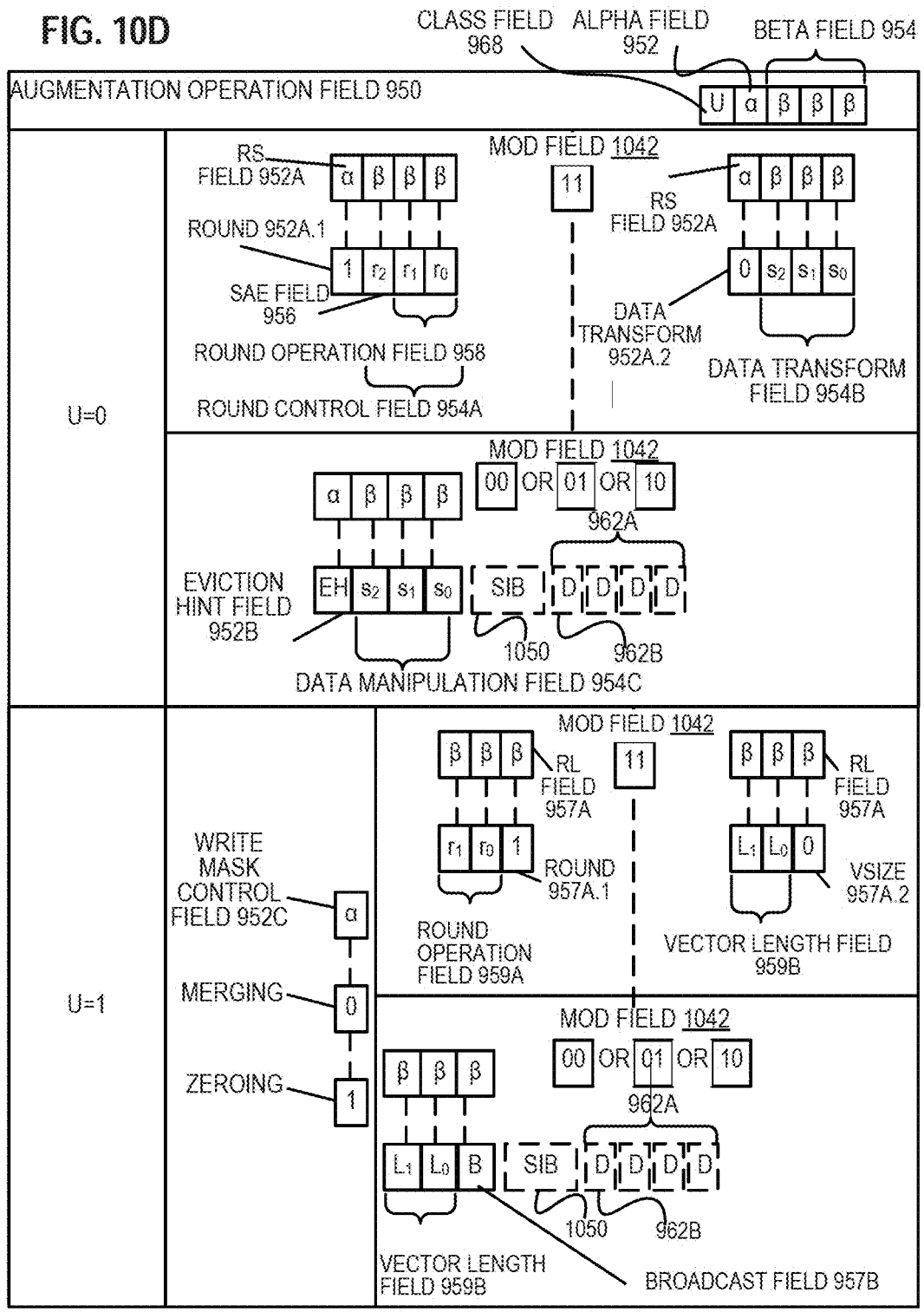
FIG. 10D is a block diagram illustrating the fields of the specific vector friendly instruction format 1000 that make up the augmentation operation field 950 according to one embodiment of the invention.

FIG. 10D is a block diagram illustrating the fields of the specific vector friendly instruction format 1000 that make up the augmentation operation field 950 according to one embodiment of the invention. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]-EH) is interpreted as the rs field 952A. When the rs field 952A contains a 1 (round 952A.1), the beta field 954 (EVEX byte 3, bits [6:4]-SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]-SSS) is interpreted as a three bit data transform field 954B. When U=0 and the MOD field 1042 contains 00, 01, or 10 (signifying a memory access operation), the alpha field 952 (EVEX byte 3, bit [7]-EH) is interpreted as the eviction hint (EH) field 952B and the beta field 954 (EVEX byte 3, bits [6:4]-SSS) is interpreted as a three bit data manipulation field 954C.

When U=1, the alpha field 952 (EVEX byte 3, bit [7]-EH) is interpreted as the write mask control (Z) field 952C. When U=1 and the MOD field 1042 contains 11 (signifying a no memory access operation), part of the beta field 954 (EVEX byte 3, bit [4]-S$_0$) is interpreted as the RL field 957A; when it contains a 1 (round 957A.1) the rest of the beta field 954 (EVEX byte 3, bit [6-5]-S$_{2-1}$) is interpreted as the round operation field 959A, while when the RL field 957A contains a 0 (VSIZE 957.A2) the rest of the beta field 954 (EVEX byte 3, bit [6-5]-S$_{2-1}$) is interpreted as the vector length field 959B (EVEX byte 3, bit [6-5]-L$_{1-0}$). When U=1 and the MOD field 1042 contains 00, 01, or 10 (signifying a memory access operation), the beta field 954 (EVEX byte 3, bits [6:4]-SSS) is interpreted as the vector length field 959B (EVEX byte 3, bit [6-5]-L$_{1-0}$) and the broadcast field 957B (EVEX byte 3, bit [4]-B).

Exemplary Register Architecture

FIG. 11 is a block diagram of a register architecture 1100 according to one embodiment of the invention. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
| --- | --- | --- | --- |
| Instruction Templates that do not include the vector length field 959B | A (FIG. 9A; U = 0) | 910, 915, 925, 930 | zmm registers (the vector length is 64 byte) |
| | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
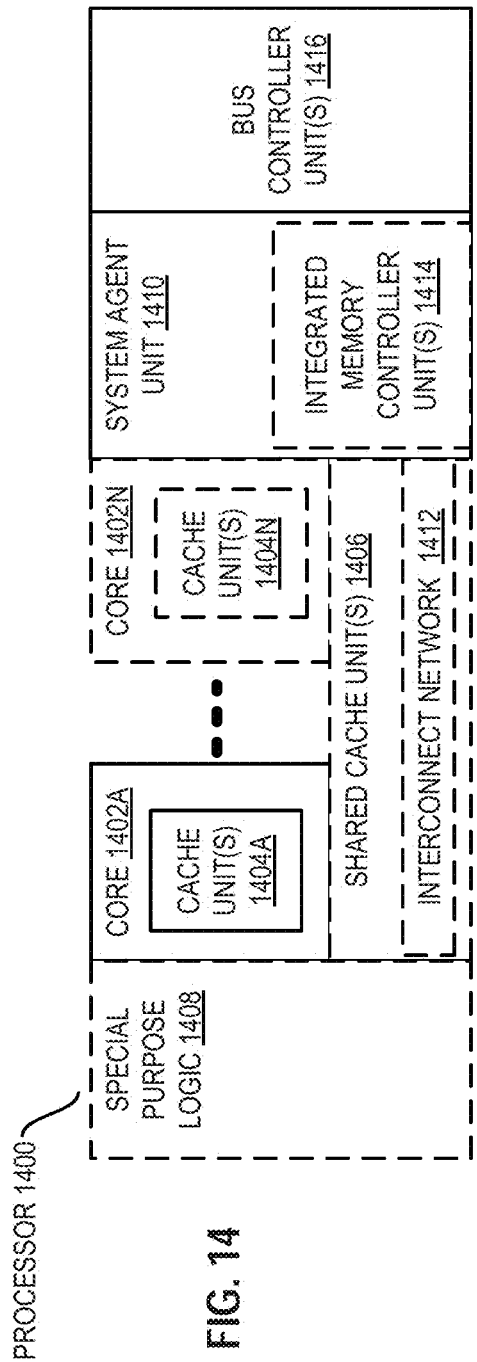
FIG. 14 is a block diagram of a processor 1400 that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
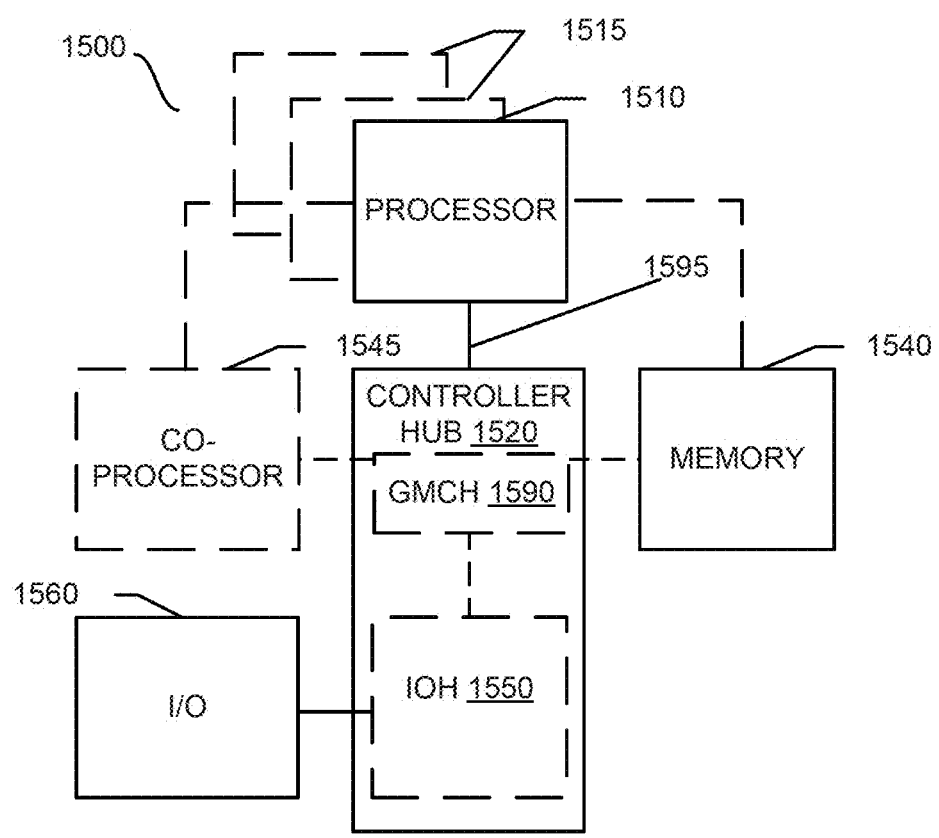
FIG. 15 shown a block diagram of a system in accordance with one embodiment of the present invention.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
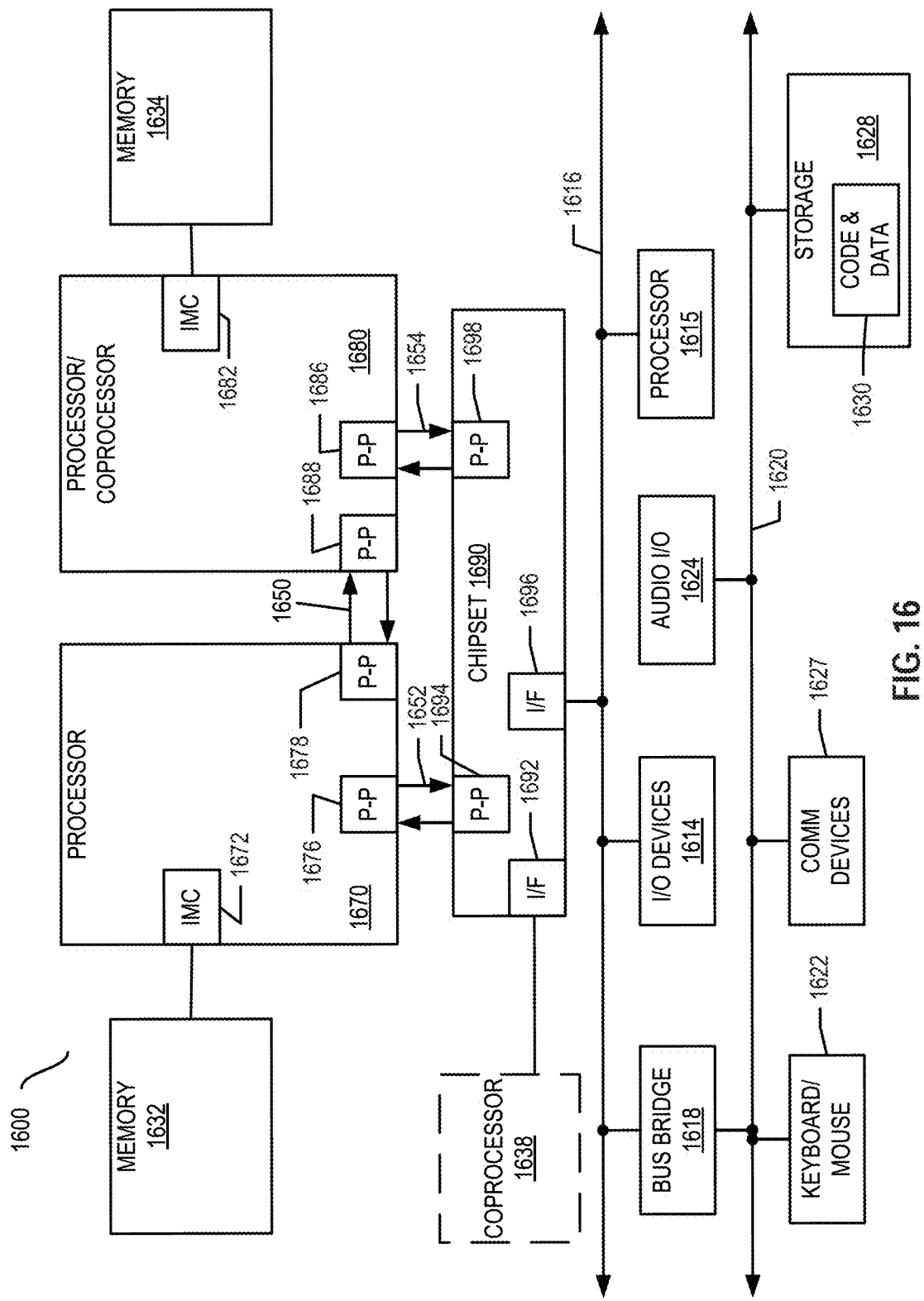
FIG. 16 is a block diagram of a first more specific exemplary system in accordance with an embodiment of the present invention.

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
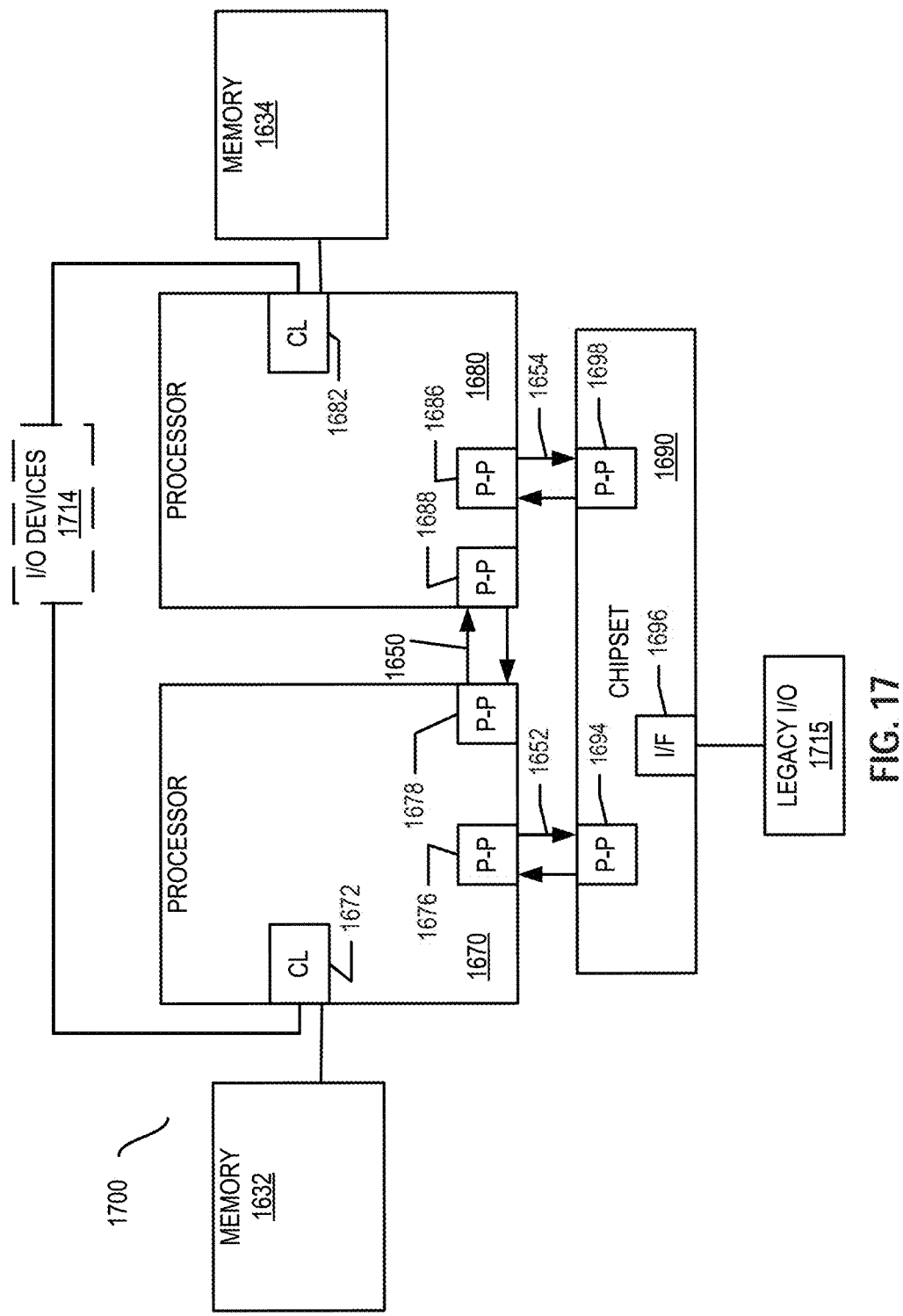
FIG. 17 is a block diagram of a second more specific exemplary system in accordance with an embodiment of the present invention.

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
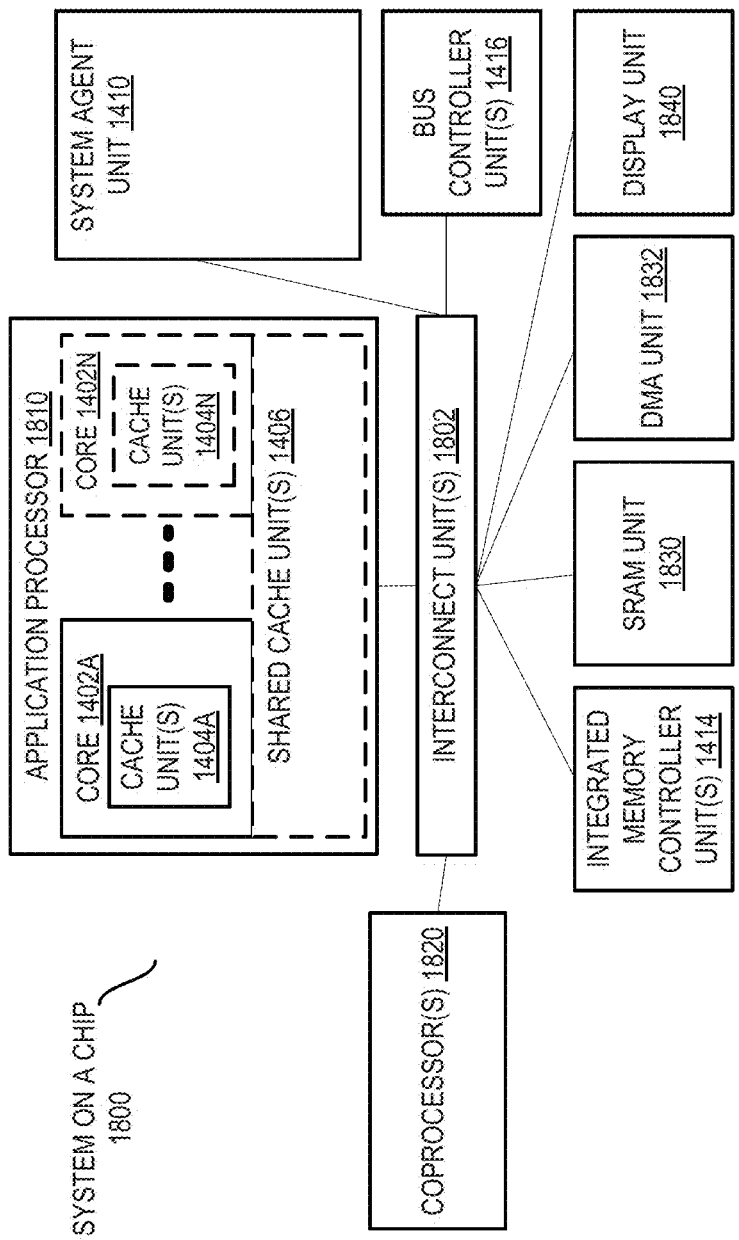
FIG. 18 is a block diagram of a SoC in accordance with an embodiment of the present invention.

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, which include cache units 1404A-N, and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

What is claimed is:

1. An apparatus comprising:
a decoder circuit to decode an instruction having fields for an opcode to define one of a plurality of potential arithmetic operations to perform, a first source operand and a second source operand, and a destination operand; and
execution circuitry to execute the decoded instruction to perform, according to the opcode, the arithmetic operation on broadcasted packed data elements of the first source operand and store results of each arithmetic operation in the destination operand, wherein the packed data elements of the first source operand to be broadcast are dictated by values of packed data elements stored in the second source operand, wherein the arithmetic operation is defined by the instruction, wherein at least some packed data elements of the first source operand are to be broadcast multiple times, wherein to execute the decoded instruction, the execution circuitry is to, for each packed data element position of the destination operand, use data from each bit position of corresponding packed data element of the second source operand as an index into a packed data element position of the first source operand, generate a result of the arithmetic operation of each value from each indexed packed data element of the first source operand, and store the result into the packed data element position of the destination operand.

2. The apparatus of claim 1, wherein the first source operand is a packed data register and the second source operand is a memory location.

3. The apparatus of claim 1, wherein the first source operand is a packed data register and the second source operand is a packed data register.

4. The apparatus of claim 1, wherein the values of packed data elements stored in the second source operand form a mask.

5. The apparatus of claim 1, wherein the arithmetic operation is one of addition, subtraction, multiplication, and division.

6. The apparatus of claim 1, wherein the apparatus is to translate the instruction from a first instruction set into an instruction of a second instruction set prior to a decode, wherein the instruction to be decoded is of the second instruction set.

7. A method comprising:
decoding an instruction having fields for an opcode to define one of a plurality of potential arithmetic operations to perform, a first source operand and a second source operand, and a destination operand, and
executing the decoded instruction according to the opcode to sum broadcasted packed data elements of the first source operand and store results of each sum in the destination operand, wherein the packed data elements of the first source operand to be broadcast are dictated by values of packed data elements stored in the second source operand, wherein at least some packed data elements of the first source operand are broadcasted multiple times, wherein executing the decoded instruction, the execution circuitry is to, for each packed data element position of the destination operand, use data from each bit position of corresponding packed data element of the second source operand as an index into a packed data element position of the first source operand, generate a result of the arithmetic operation of each value from each indexed packed data element of the first source operand, and store the result into the packed data element position of the destination operand.

8. The method of claim 7, wherein the first source operand is a packed data register and the second source operand is a memory location.

9. The method of claim 7, wherein the first source operand is a packed data register and the second source operand is a packed data register.

10. The method of claim 7, wherein the values of packed data elements stored in the second source operand form a mask.

11. The method of claim 7, wherein for each packed data element position of the destination operand, using data from each bit position of corresponding packed data element of the second source operand as an index into a packed data element position of the first source operand, generating a sum of each value from each indexed packed data element of the first source operand, and storing the sum into the packed data element position of the destination operand.

12. The method of claim 7, wherein an initial value from the destination is another input used in the sum generation.

13. The method of claim 7, further comprising:
translating the instruction from a first instruction set into an instruction of a second instruction set prior to a decode, wherein the instruction to be decoded is of the second instruction set.

14. A non-transitory machine-readable medium storing an instruction which when processed by a processor causes the processor to perform a method, the method comprising:
decoding the instruction having fields for an opcode to define one of a plurality of potential arithmetic operations to perform, a first source operand and a second source operand, and a destination operand, and
executing the decoded instruction according to the opcode to sum broadcasted packed data elements of the first source operand and store results of each sum in the destination operand, wherein the packed data elements of the first source operand to be broadcast are dictated by values of packed data elements stored in the second source operand, wherein at least some packed data elements of the first source operand are broadcasted multiple times, wherein executing the decoded instruction, the execution circuitry is to, for each packed data element position of the destination operand, use data from each bit position of corresponding packed data element of the second source operand as an index into a packed data element position of the first source operand, generate a result of the arithmetic operation of each value from each indexed packed data element of the first source operand, and store the result into the packed data element position of the destination operand.

15. The non-transitory machine-readable medium of claim 14, wherein the first source operand is a packed data register and the second source operand is a memory location.

16. The non-transitory machine-readable medium of claim 14, wherein the first source operand is a packed data register and the second source operand is a packed data register.

17. The non-transitory machine-readable medium of claim 14, wherein the values of packed data elements stored in the second source operand form a mask.

18. The non-transitory machine-readable medium of claim 14, wherein for each packed data element position of the destination operand, using data from each bit position of corresponding packed data element of the second source operand as an index into a packed data element position of the first source operand, generating a sum of each value from each indexed packed data element of the first source operand, and storing the sum into the packed data element position of the destination operand.

19. The non-transitory machine-readable medium of claim 14, wherein an initial value from the destination is another input used in the sum generation.

20. The non-transitory machine-readable medium of claim 14, further comprising:
translating the instruction from a first instruction set into an instruction of a second instruction set prior to a decode, wherein the instruction to be decoded is of the second instruction set.

* * * * *